United States Patent
Jo et al.

(10) Patent No.: US 9,904,918 B2
(45) Date of Patent: Feb. 27, 2018

(54) MOBILE TERMINAL AND CONTROL METHOD THEREFOR

(71) Applicant: LG ELECTRONICS INC., Seoul (KR)

(72) Inventors: Hoon Jo, Seoul (KR); Gunmin Lee, Seoul (KR); Kangwon Seo, Seoul (KR); Sukwon Kim, Seoul (KR); Younghun Nam, Seoul (KR); Younghyun Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/323,390

(22) PCT Filed: Oct. 20, 2014

(86) PCT No.: PCT/KR2014/009819
§ 371 (c)(1),
(2) Date: Dec. 30, 2016

(87) PCT Pub. No.: WO2016/003018
PCT Pub. Date: Jan. 7, 2016

(65) Prior Publication Data
US 2017/0154326 A1 Jun. 1, 2017

(30) Foreign Application Priority Data

Jul. 2, 2014 (KR) .................. 10-2014-0082728
Jul. 9, 2014 (KR) .................. 10-2014-0086343
Jul. 17, 2014 (KR) .................. 10-2014-0090526

(51) Int. Cl.
*G06Q 20/32* (2012.01)
*H04W 4/04* (2009.01)
(Continued)

(52) U.S. Cl.
CPC ......... *G06Q 20/3278* (2013.01); *G06Q 20/34* (2013.01); *H04B 5/0031* (2013.01);
(Continued)

(58) Field of Classification Search
CPC .......................... G06Q 20/3278; H04W 4/04
See application file for complete search history.

(56) References Cited

U.S. PATENT DOCUMENTS

2013/0212007 A1\* 8/2013 Mattsson ............. G06Q 20/405
705/39
2013/0231051 A1\* 9/2013 Naruse .................. G06F 3/1204
455/41.2

FOREIGN PATENT DOCUMENTS

KR 10-2013-0059204 6/2013
KR 10-2013-0085758 7/2013
(Continued)

OTHER PUBLICATIONS

PCT International Application No. PCT/KR2014/009819, International Search Report dated Mar. 19, 2015, 4 pages.

*Primary Examiner* — Tuan H Nguyen
(74) *Attorney, Agent, or Firm* — Lee, Hong, Degerman, Kang & Waimey

(57) ABSTRACT

A mobile terminal and a control method therefor are disclosed. The mobile terminal and the control method therefor of the present invention can: broadcast, to at least one external electronic device, advertising data and a signal for requesting the activation of a second layer included in a communication unit of the at least one external electronic device through a first layer related to low-power near field communication technology; pair with a specific electronic device through a second layer related to specific near field communication technology distinguished from the low-power near field communication technology, if a response to the activation request is received from the specific electronic
(Continued)

device among the at least one external electronic device; and transmit data to the paired specific electronic device. According to the present invention, pairing can be performed so as to form a communication channel using second near field communication technology by using first near field communication technology of low energy, when a specific event occurs.

11 Claims, 37 Drawing Sheets

(51) Int. Cl.
*H04W 76/02* (2009.01)
*H04W 4/00* (2018.01)
*H04B 5/00* (2006.01)
*H04W 64/00* (2009.01)
*H04W 4/06* (2009.01)
*G06Q 20/34* (2012.01)
*H04W 88/02* (2009.01)

(52) U.S. Cl.
CPC ............ *H04W 4/008* (2013.01); *H04W 4/04* (2013.01); *H04W 4/06* (2013.01); *H04W 64/00* (2013.01); *H04W 76/023* (2013.01); *H04W 88/02* (2013.01)

(56) References Cited

FOREIGN PATENT DOCUMENTS

| KR | 10-2014-0009070 | 1/2014 |
| KR | 10-2014-0074153 | 6/2014 |

* cited by examiner

FIG. 4
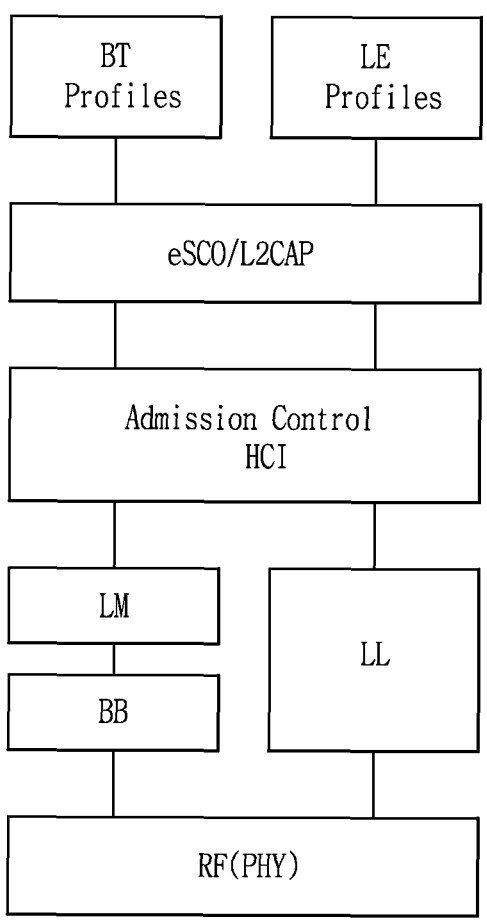
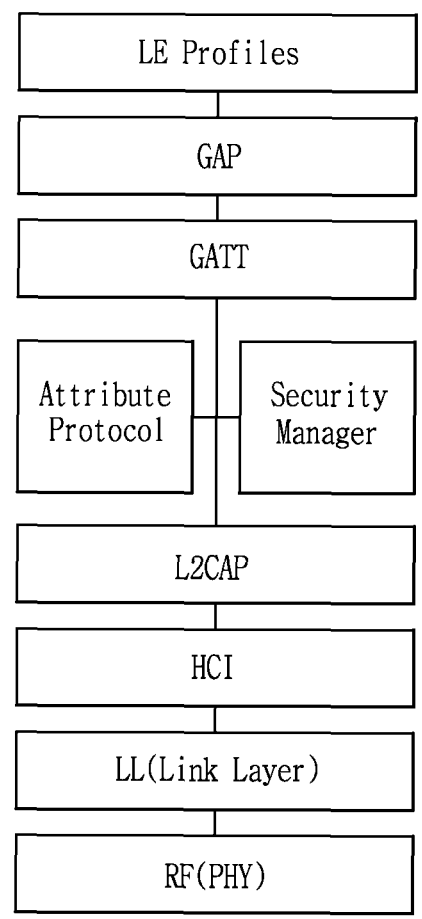
(a)  (b)

FIG. 23
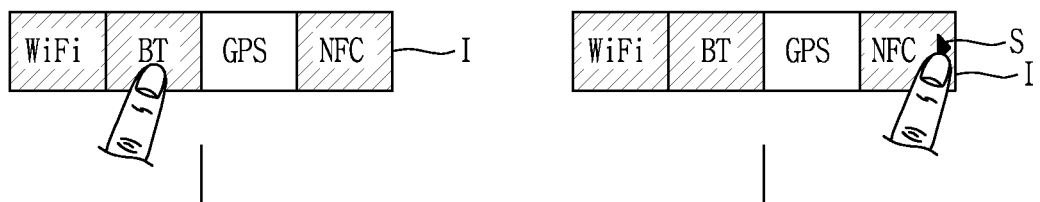
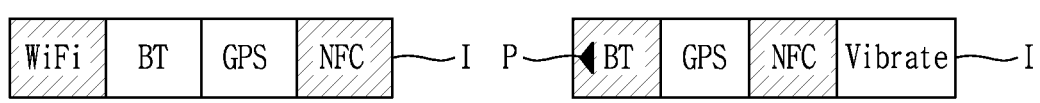
(a)  (b)
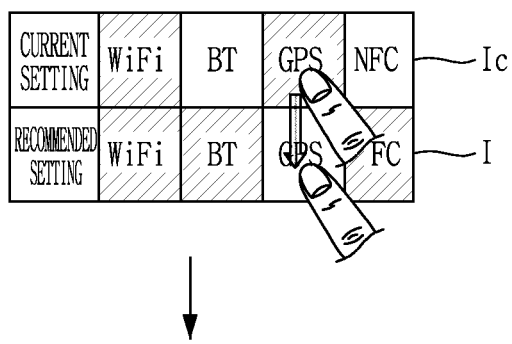
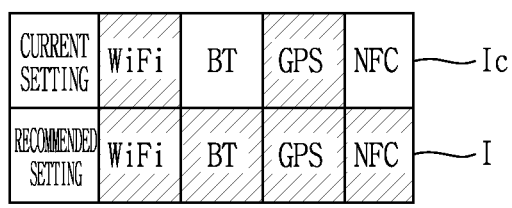
(c)

FIG. 28
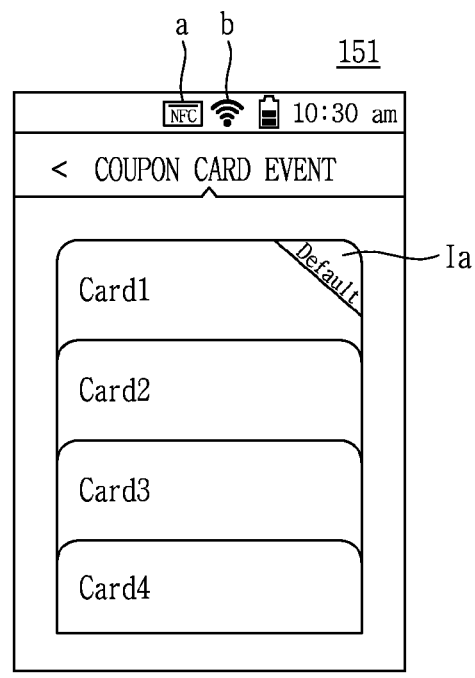
(a)
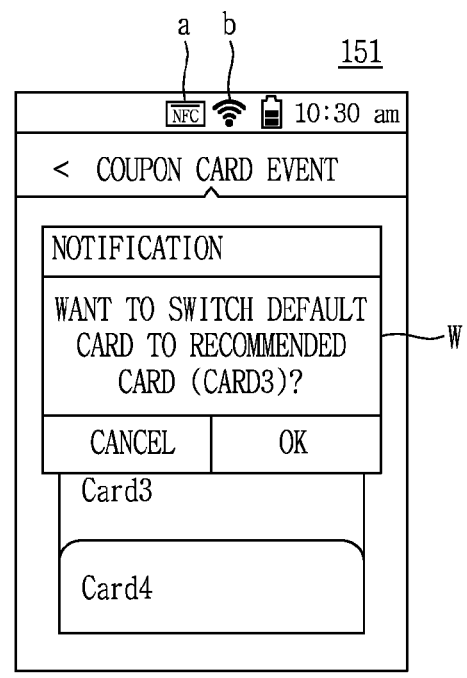
(b)
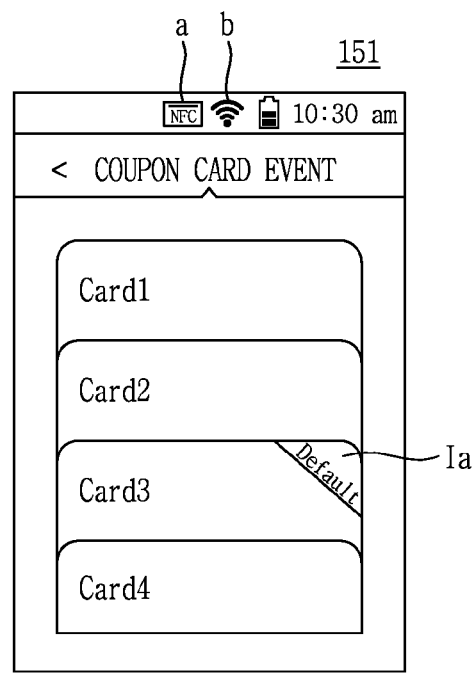
(c)

FIG. 29
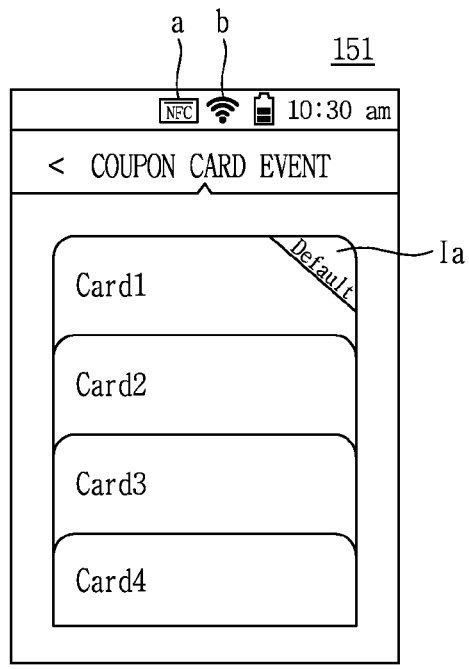
(a)
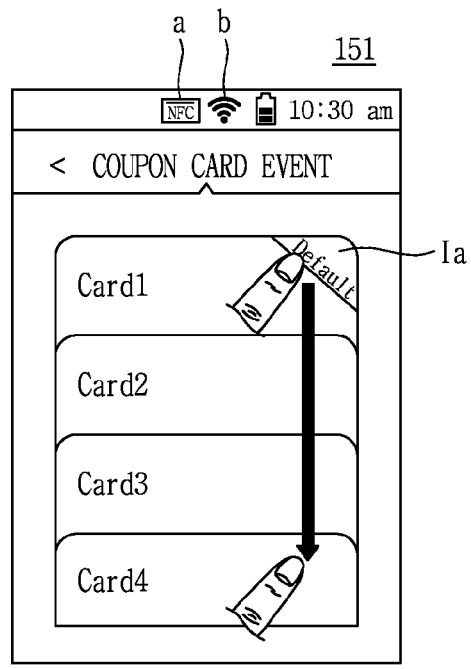
(b)
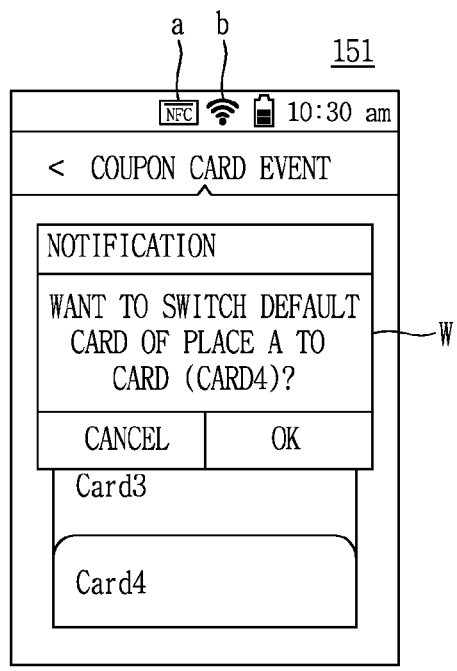
(c)
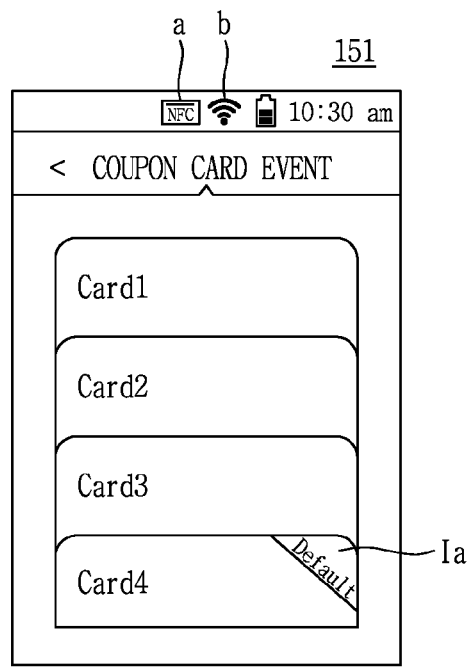
(d)

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2014/009819, filed on Oct. 20, 2014, which claims the benefit of earlier filing date and right of priority to Korean Patent Application Nos. 10-2014-0082728, filed on Jul. 2, 2014, 10-2014-0086343, filed on Jul. 9, 2014, and 10-2014-0090526, filed on Jul. 17, 2014, the contents of which are all hereby incorporated by reference herein in their entirety.

TECHNICAL FIELD

The present disclosure relates to a mobile terminal using a low-power near field communication technology and a control method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Efforts are ongoing to support and increase the functionality of mobile terminals. Such efforts include software and hardware improvements, as well as changes and improvements in the structural components.

In particular, in order to perform near field communication, a terminal is required to activate a near field communication channel land perform pairing.

Also, the terminal includes a plurality of modules performing various functions and each module may be controlled to be activated or deactivated as necessary. However, a setting of the terminal is determined according to a manual user selection. That is, a user should directly change whether to activate each module, and in order to change a setting of the terminal, the user should terminate a specific application being executed, change a setting of the terminal, and execute the specific application again.

Also, in a case in which payment is performed using an NFC communication technique, the user should manually activate an NFC wireless communication module and select a payment card, causing inconvenience.

DISCLOSURE

Technical Problem

An object of the present disclosure is to solve the aforementioned problems and other problems.

Another object of the present disclosure is to provide a mobile terminal capable of broadcasting advertising data and a request for activation of a specific layer or a specific communication module to at least one external electronic device using communication techniques of different layers of a communication unit or using different communication modules of the communication unit, performing, when a response with respect to the activation request is received from a specific electronic device among at least one external electronic device, pairing with the specific electronic device, and transmitting data to the paired specific electronic device, and a control method thereof.

Another aspect of the present disclosure provides a mobile terminal capable of determining and displaying, when entering a specific place related to an external wireless sensor, recommended setting information of the terminal using information related to the specific place received from the external wireless sensor, and changing a setting of the terminal to corresponding to the recommended setting information when a first input regarding the recommended setting information is received, and a control method thereof.

Another aspect of the present disclosure provides a mobile terminal capable of detecting entering a specific place using a Bluetooth low energy (BLE) technology, and performing control to use a near field communication technology distinguished from the BLE technology when information related to the specific place is received, and a control method thereof.

Technical Solution

In an aspect, a mobile terminal includes: a communication unit including a first layer related to a low-power near field communication technology and a second layer related to a specific near field communication technology distinguished from the low-power near field communication technology; and a controller broadcasting advertising data and a signal for requesting activation of a second layer included in a communication unit of at least one external electronic device to the at least one external electronic device through the first layer, and controlling, when a response with respect to the activation request is received from a specific electronic device among the at least one external electronic device, the communication unit to perform pairing with the specific electronic device through the second layer and transmit data to the paired specific electronic device.

In another aspect, a mobile terminal includes: a first wireless communication module performing communication using a low-power near field communication technology; a second wireless communication module communicating with an external electronic device using a specific near field communication technology distinguished from the low-power near field communication technology; and a controller broadcasting advertising data and a signal for requesting activation of a second wireless communication module provided in at least one external electronic device to at least one external electronic device using the low-power near field communication technology, controlling the first wireless communication module to receive a response with respect to the activation request from a specific electronic device among the at least one external electronic device, and controlling the second wireless communication module to perform pairing with the second wireless communication module provided in the specific electronic device and transmitting data to the paired second wireless communication module.

In another aspect, a control method of a mobile terminal includes: broadcasting advertising data and a signal for requesting activation of a second layer included in a communication unit of at least one external electronic device to the at least one external electronic device through a first layer; receiving a response with respect to the activation request from a specific electronic device among the at least one external electronic device; when a response with respect to the activation request is received, performing pairing with the specific electronic device through the second layer; and transmitting data to the paired specific electronic device, wherein the first layer relates to a low-power near field communication technology and the second layer relates to a specific near field communication technology distinguished from the low power wireless communication technology.

In another aspect, a control method of a mobile terminal includes: broadcasting advertising data and a signal for requesting activation of a second wireless communication module provided in at least one external electronic device to at least one external electronic device through a first wireless communication module using a low-power near field communication technology; receiving a response with respect to the activation request from a specific electronic device among the at least one external electronic device; performing pairing with a second wireless communication module provided in the specific electronic device through the second wireless communication module performing communication using a specific near field communication technology distinguished from the low-power near field communication technology; and transmitting data to the paired specific electronic device.

In another aspect, a mobile terminal includes: a display unit; a wireless communication unit receiving information related to a specific place from an external wireless sensor using a Bluetooth low power (BLE) technology; and a controller determining, when the mobile terminal enters the specific place, recommended setting information of the terminal using information related to the specific place received through the wireless communication unit and displaying the determined recommended setting information on the display unit; and changing, when a first input regarding the recommended setting information is received, a setting of the terminal to correspond to the recommended setting information.

In another aspect, a control method of a mobile terminal includes: when the mobile terminal enters a specific place related to an external wireless sensor, receiving information related to the specific place from the external wireless sensor using low power Bluetooth technology; determining recommended setting information of the terminal using the received information related to the specific place and displaying the determined recommended setting information; and when a first input regarding the displayed recommended setting information is received, changing a setting of the terminal to correspond to the recommended setting information.

In another aspect, a mobile terminal includes: a first wireless communication module receiving information related to a specific place from an external wireless sensor using a low power Bluetooth technology; a second wireless communication module performing communication using a wireless communication technology distinguished from the first wireless communication module; and a controller sensing the mobile terminal entering the specific place through the first wireless communication module, activating, when information related to the specific place is received, the second wireless communication module, and executing a specific application related to the second wireless communication module.

In another aspect, a control method of a mobile terminal includes: sensing the mobile terminal entering a specific place from an external wireless sensor through a first wireless communication module using a low power Bluetooth technology; receiving information related to the specific place from the external wireless sensor; controlling the second wireless communication module to be activated when the mobile terminal entering the specific place is sensed and information related to the specific place is received; and executing a specific application related to the second wireless communication module.

Advantageous Effects

The mobile terminal and the control method have the following advantageous effects.

According to at least one of embodiments of the present disclosure, a near field communication module of an external electronic device or a layer controlling the same may be controlled to be activated.

Also, according to at least one of embodiments of the present disclosure, pairing may be automatically performed by broadcasting a signal for performing pairing using a low-power near field communication technology.

Also, according to at least one of embodiments of the present disclosure, since specific information is received from an external wireless sensor using Bluetooth low energy (BLE), battery consumption may be reduced.

Also, according to at least one of embodiments of the present disclosure, even in a case in which a terminal is positioned in an indoor area, accurate position information may be obtained using specific information received from an external wireless sensor.

Also, according to at least one of embodiments of the present disclosure, since a setting of a terminal is automatically changed according to characteristics of an area where a terminal is positioned, battery consumption may be minimized, while securing user convenience.

Also, according to at least one of embodiments of the present disclosure, a setting of an NFC module of a terminal is automatically changed according to characteristics of an area where the terminal is positioned, and a payment card may be automatically selected, minimizing battery consumption, while securing user convenience.

An additional scope of applicability of the present invention shall become obvious from the detailed description in the following. It is to be understood that both the foregoing general description and the following detailed description of the preferred embodiments of the present invention are exemplary and explanatory and are intended to provide further explanation of the invention as claimed.

DESCRIPTION OF DRAWINGS

FIG. 4 is a view illustrating a structure of a protocol structure of a Bluetooth low energy (BLE) technology applied to a mobile terminal related to the present disclosure.

FIGS. 16 to 24 are views illustrating the third embodiment of a control method of a mobile terminal related to the present disclosure.

FIGS. 26 to 36 are views illustrating the fourth embodiment of a control method of a mobile terminal related to the present disclosure.

BEST MODE

Figure 1A:
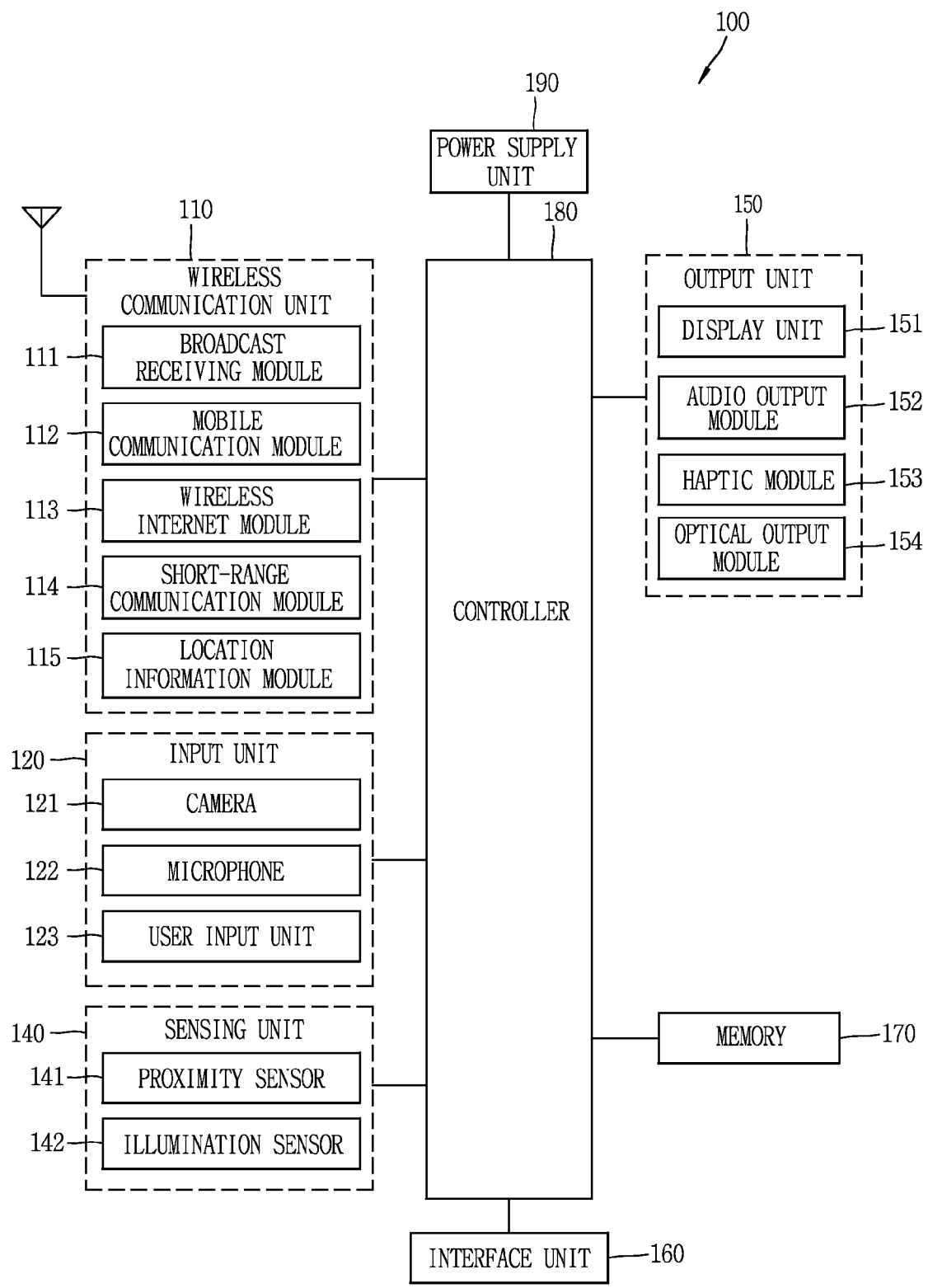
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
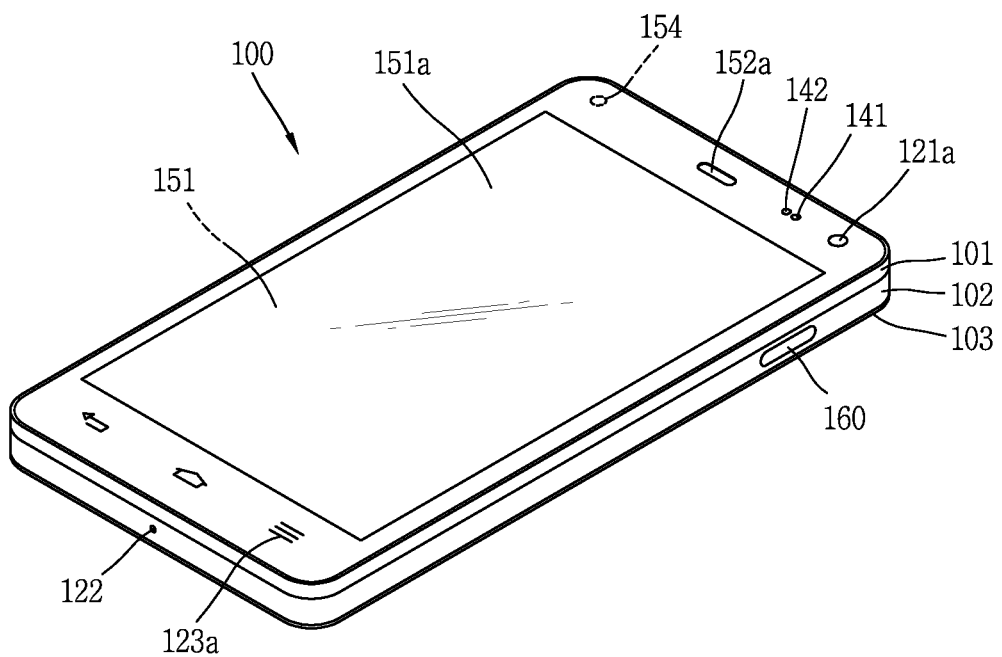
FIGS. 1B and 1C are conceptual views of one example of the mobile terminal, viewed from different directions.
Figure 1C:
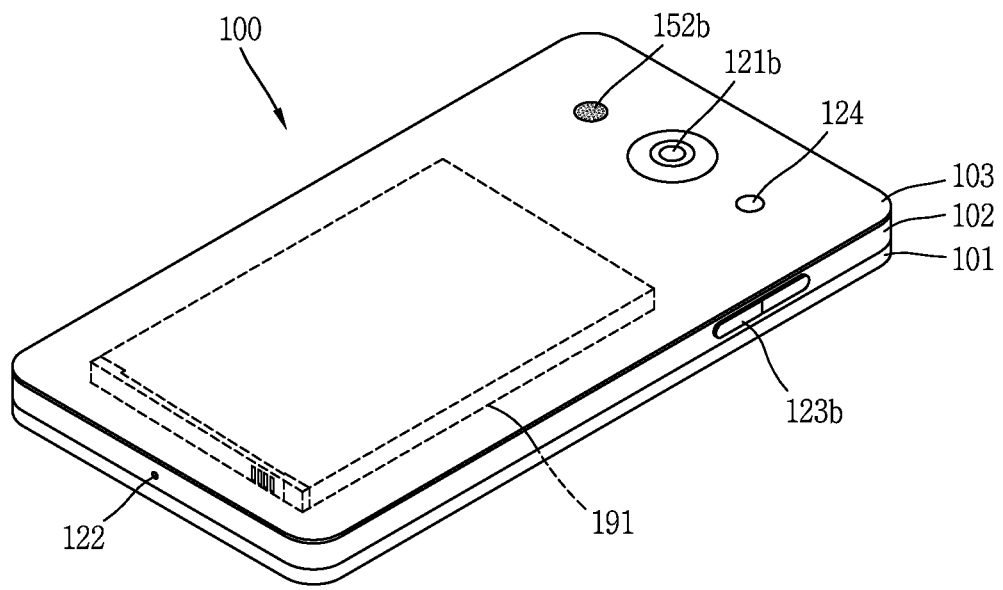

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit 152 by a stereoscopic processing unit 152a. The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Meanwhile, beyond a level at which a user holds a mobile terminal in hand to use it, a mobile terminal may extend to a wearable device that can be worn on a human body. The wearable device may include a smart watch, a smart glass, a head mounted display (HMD), and the like. Hereinafter, examples of a mobile terminal extending to a wearable device will be described.

A wearable device may be configured to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
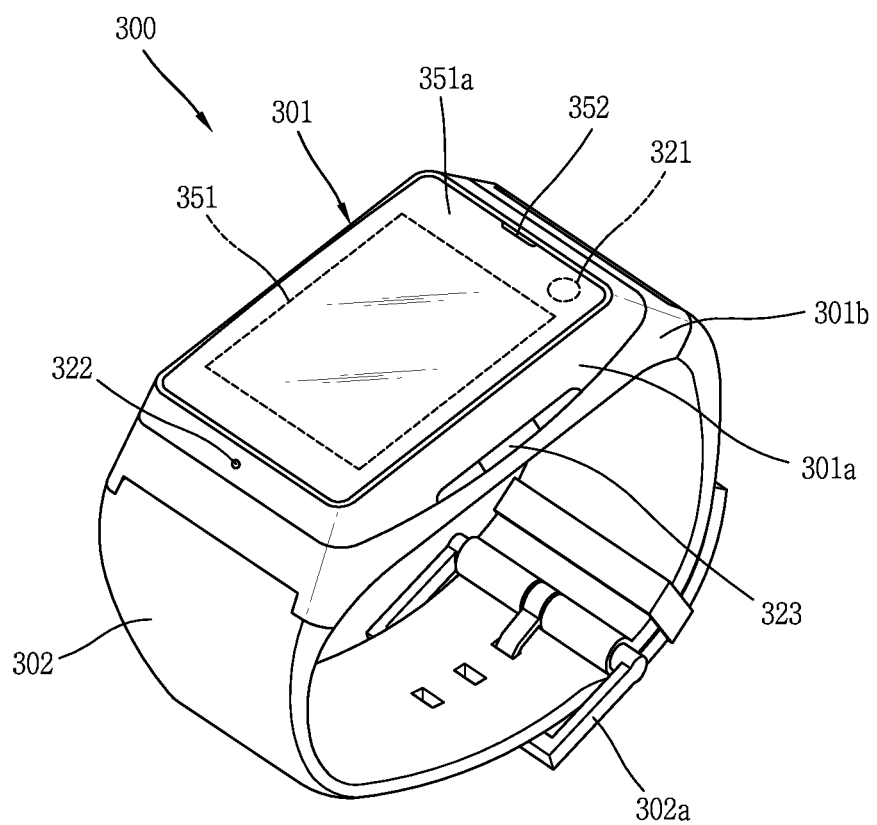
FIG. 2 is a perspective view illustrating an example of a watch type mobile terminal related to the present disclosure.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 3:
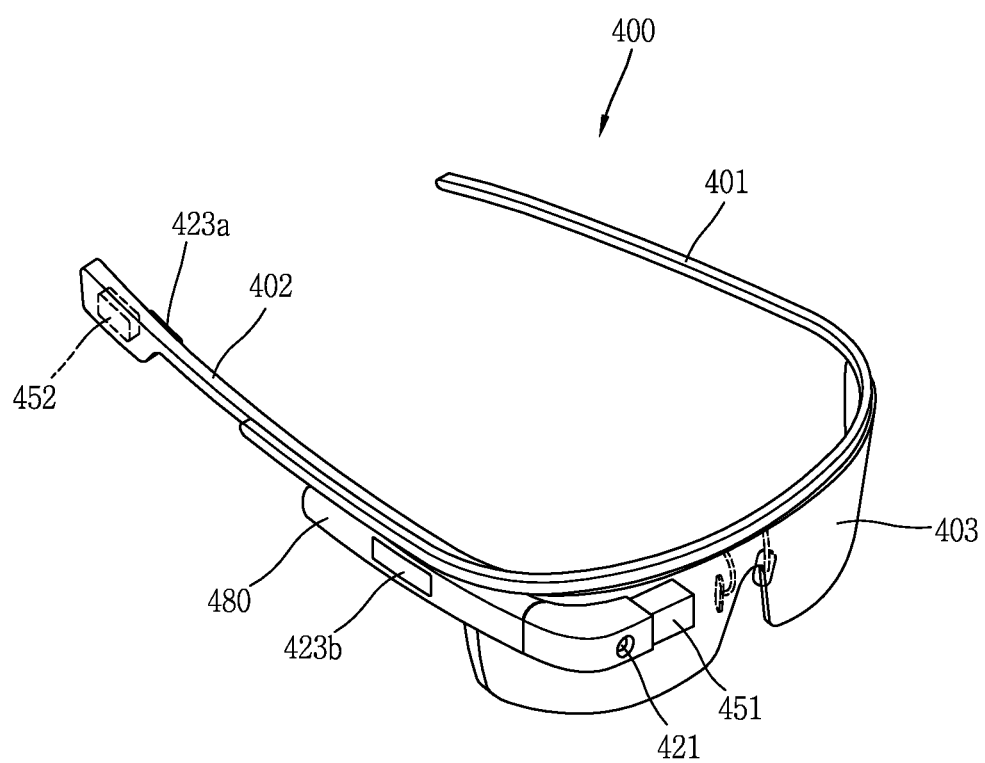
FIG. 3 is a perspective view illustrating an example of a glass type mobile terminal related to the present disclosure.

FIG. 3 is a perspective view illustrating an example of a glass type terminal 400 related to another embodiment of the present disclosure.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Hereinafter, a communication system that can be performed through the mobile terminal 100 according to the present disclosure will be described.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Also, Bluetooth is a standard for wireless communication at low energy between devices within a short range. After Bluetooth version 1.0B was presented in December 1999, version 1.2 employing adaptive frequency hopping (AFH) was adopted in November 2003. 2.0+EDR (Enhanced Data Rate) having a data rate enhanced to a maximum 3 times faster was presented in October 2004 and 2.1+EDR including secure simple paring (SSP) simplifying a connection method and strengthening a security function was released in July 2007. Equipped with the EDR function, 2.1+EDR enhanced an existing transfer rate to 2 to 3 times faster but with a limitation in transmission of high speed data such as a streaming service, or the like. Overcoming such a limitation, a version 3.0+HS (High Speed) 8 times faster than the EDR method was released in April 2009. The version 3.0+HS enables a large capacity data transmission service such as data streamlining, video transmission, and the like, between existing Bluetooth devices. Also, installation of a power management function reduces power consumption, compared with a previous version. As Bluetooth SIG (Special Interest Group) absorbed Wibree technology, super-low energy application technology, which had been standardized by Wibree forum, by Bluetooth standard in June 2007, a new application field termed Bluetooth low energy was developed to present Bluetooth version 4.0 equipped with low energy technology in June 2010. The use of version 4.0 significantly reduces power consumption to manufacture a dual-mode product supporting both existing Bluetooth and low energy technology, as well as a single mode product available for sports, healthcare, sensors, device control, and the like.

Bluetooth modules equipped with version 4.0 are provided in recent mobile terminals to allow the use of both existing Bluetooth and low energy technology. Compared with an existing Bluetooth standard, the low energy technology of Bluetooth version 4.0 has relatively small duty cycle, is manufactured at low costs, and significantly reduces power consumption through a low data rate. Also, it simplifies a device connection procedure and a packet size thereof is designed to be smaller than that of existing Bluetooth.

FIG. 4 is a view illustrating a protocol structure of Bluetooth low energy applied to a mobile terminal related to the present disclosure.

Referring to FIG. 4, Bluetooth low energy may be implemented in two types of a dual mode and a single mode. The dual mode in which existing Bluetooth and low energy technology coexist, which is largely used in mobile phones ((a) of FIG. 4), and the single module is used in an independent product such as a sensor, or the like, ((b) of FIG. 4). In order to be compatible with existing Bluetooth technology, RF, HCI (Host Controller Interface), and L2CAP (Logical Link Control and Adaptation Protocol) layers are the same as existing layers and some functions are added for low energy technology. In the low energy technology, an LL layer serves as BB (baseband) and LM (Link Manager) of existing Bluetooth. In existing Bluetooth, a GAP (Generic Access Profile) layer performs a security function, while in the low energy technology, an SM (Security Manager) layer is creased to strengthen a security function. In a wireless communication, a distribution key scheme is used for identification and encryption and security capability of a key relies on performance of a distributing algorithm of a device. A GAP (Generic Access Profile) layer is newly implemented for BLE technology different from the existing Bluetooth, used for selecting a role for communication between low energy devices and control how a multi-profile operation takes place, and mainly used in device search, connection generation, and security procedure part. Newly added layers include an attribute protocol, which is used for communication between a server and a client and has an attribute handle used for a client to access attributes of a server. Protocol operation commands include "Request", "Response", "Command", "Notification", "Indication", "Confirmation", and the like. A GATT (Generic Attribute Profile) layer performing a function such as service search, recognition of a characteristic value, read, write, and the like, using an attribute protocol is also a newly created layer. GATT defines a service framework and a service format and procedure using the attribute protocol. This procedure defines setting of discovering, reading, writing, notify, and indicating characteristics.

The BLE technology is operable independently from an existing Bluetooth technology, and the controller 180 (of FIG. 1A) may set to maintain the BLE technology constantly in an ON state according to a user selection when power of a mobile terminal operating in the dual mode is applied.

Embodiments related to a control method that may be implemented in the mobile terminal configured as described above will be described with reference to the accompanying drawings. The present invention may be carried out in other specific ways than those set forth herein without departing from the spirit and essential characteristics of the present invention.

Hereinafter, a specific embodiment of the present disclosure will be described.

Figure 5:
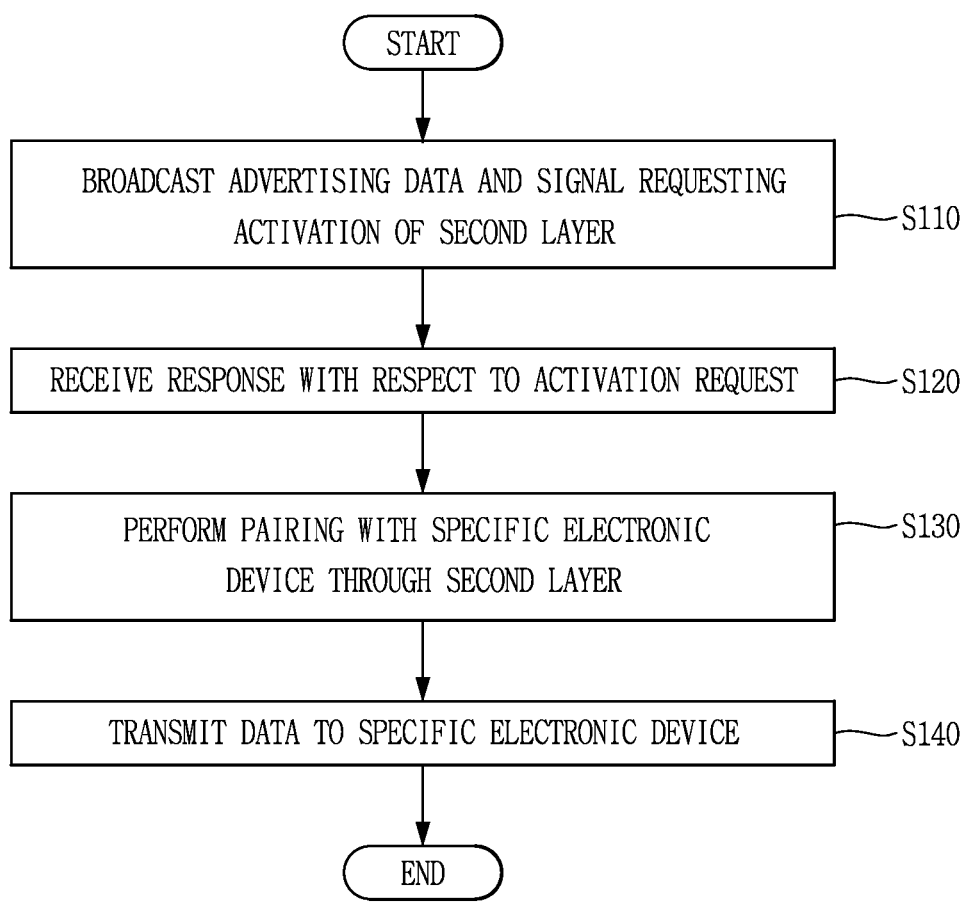
FIGS. 5 and 6 are flow charts illustrating a first embodiment of a control method of a mobile terminal related to the present disclosure.
Figure 6:
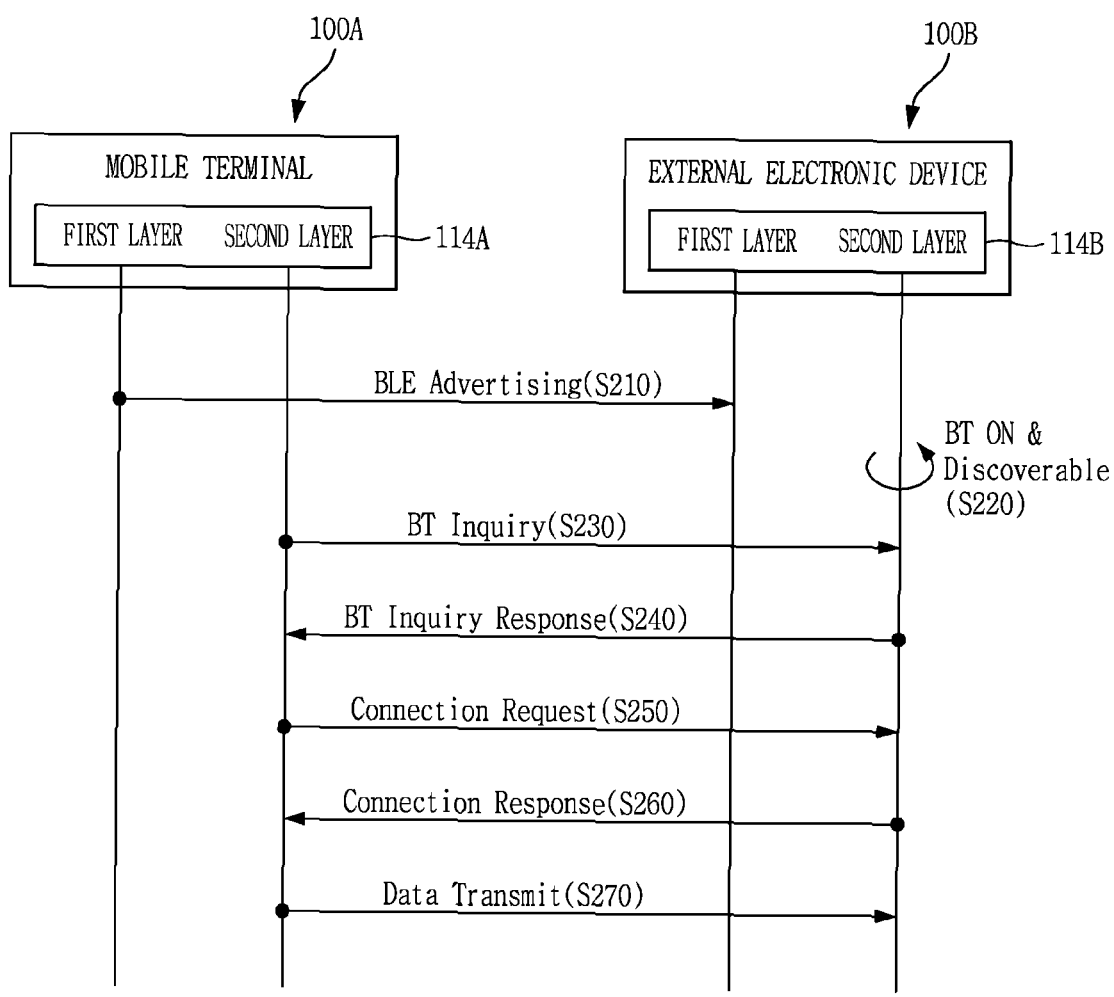

FIGS. 5 and 6 are flow charts illustrating a first embodiment of a control method of a mobile terminal related to the present disclosure.

Referring to FIG. 5, the controller (180 of FIG. 1A) of the mobile terminal may search for a specific electronic device among at least one external electronic device using mutually different layers and perform pairing with the specific electronic device.

The controller (180 of FIG. 1A) may broadcast advertising data and a signal requesting activation of a second layer included in a communication unit of at least one external electronic device to at least one external electronic device through a first layer (S110).

The first layer includes a physical layer supporting a low energy technology (e.g., an LE profile layer of FIG. 4), and the second layer includes a physical layer supporting an existing Bluetooth technology (e.g., a BT profile layer of FIG. 4). Here, the first layer or the second layer may be at least one physical layer, and in a case in which two or more physical layers are connected to perform one function, the first layer or the second layer may refer to two or more physical layers.

Since the controller performs broadcasting through the first layer as a physical layer supporting LE technology, battery consumption of the terminal may be minimized.

The controller (180 of FIG. 1A) may receive a response regarding the activation request from a specific electronic device among at least one external electronic device (S120). The specific electronic device may refer to an electronic device that the terminal has authority to access, among the electronic devices which have received the broadcast data. The advertising data may include a significant part and a non-significant part, and here, the significant part is an actual data part and the non-significant part starts from a portion where the significant part ends and all 31 bytes thereof is filled with 0. A first byte of the advertising data represents a length, and a next byte may be a type of the advertising data, actual information of the advertising data, and the like. The advertising data may include a universally unique identifier, a local name of equipment, a state (flags) of a physical channel of BLE, transmission power (Tx Poxer), manufacturer information (manufacturer specific data), and the like.

When a response regarding the activation request is received (S120), the controller (180 of FIG. 1A) may perform pairing with the specific electronic device through a second layer (S130) and transmit data to the paired specific electronic device (S140).

The specific electronic device refers to an electronic device which has received the advertising data and which is accessible to the terminal. When the response is received from the specific electronic device, the controller may request pairing from the specific electronic device. The specific electronic device may form a near field communication channel in response to the pairing request.

According to the present disclosure, in a state in which an existing Bluetooth function of Bluetooth version 4.0 is not activated, the existing Bluetooth function may be activated to perform pairing using BLE.

Referring to FIG. 6, the controller (180 of FIG. 1A) of the mobile terminal may activate Bluetooth of the specific electronic device to perform pairing and transmit data.

In detail, a controller of a mobile terminal 100A may request advertising data through a first layer of a communication unit 114A and activation of a second layer included in a communication unit 114B of a specific electronic device 100B. That is, the controller of the mobile terminal 100A may transmit advertising data and a signal requesting activation of the second layer to the specific electronic device 100B using BLE (S210). Here, it is based upon the premise that the mobile terminal 100A and the specific electronic device 100B will set BLE to an activation state.

When the advertising data and the signal requesting activation of the second layer are received, the specific electronic device 100B may activate the second layer performing the existing Bluetooth function of Bluetooth version 4.0 and change a setting to a state in which a device is able to be searched (S220).

When the specific electronic device 100B activates the second layer and changes the setting to the state in which a device is able to be searched, the controller of the mobile terminal 100A may inquire about whether the existing Bluetooth function of Bluetooth version 4.0 is available to be used through the second layer (S230) and receive a response (S240).

The controller of the mobile terminal 100A performs pairing with the second layer of the specific electronic device 100B through the second layer (S250, S260), and transmit data through a paired communication channel (S270).

According to the first embodiment of the present disclosure, among the first layer and the second layer included in the Bluetooth version 4.0 module, the first layer related to a low energy function is set to a constantly activated state and the second layer related to the existing Bluetooth function is changed to a selectively activated state, thereby performing pairing.

Figure 7:
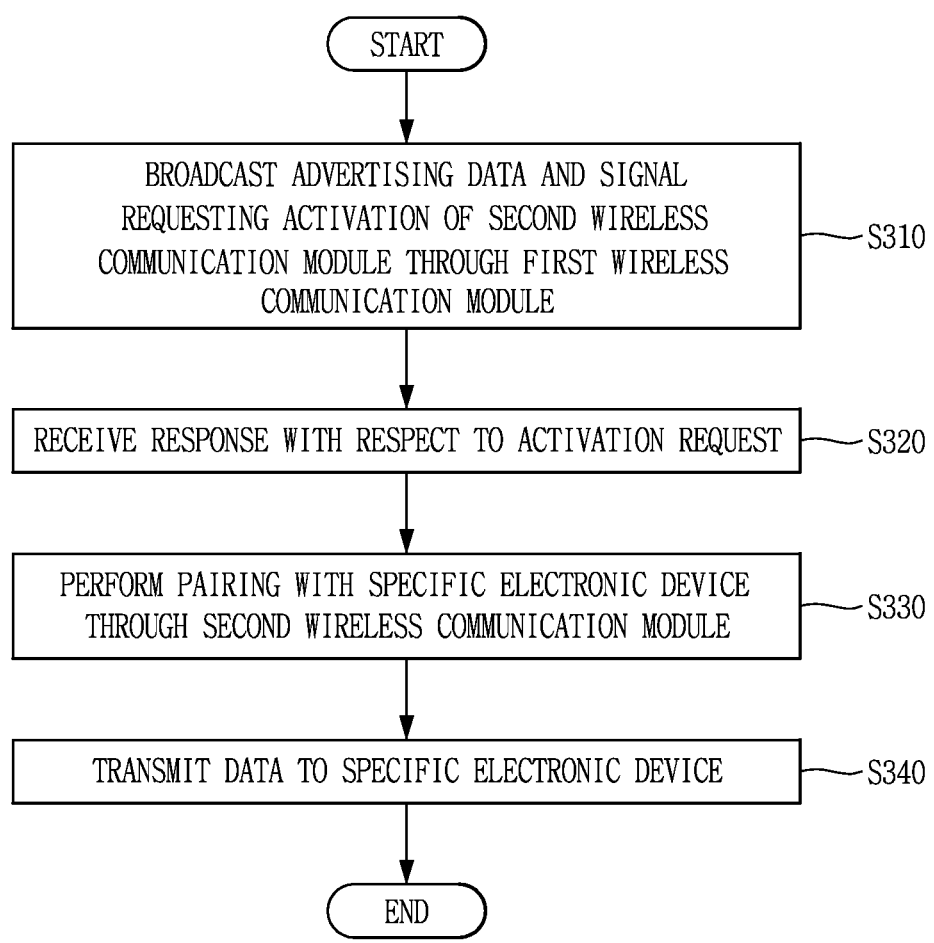
FIGS. 7 and 8 are flow charts illustrating a second embodiment of a control method of a mobile terminal related to the present disclosure.
Figure 8:
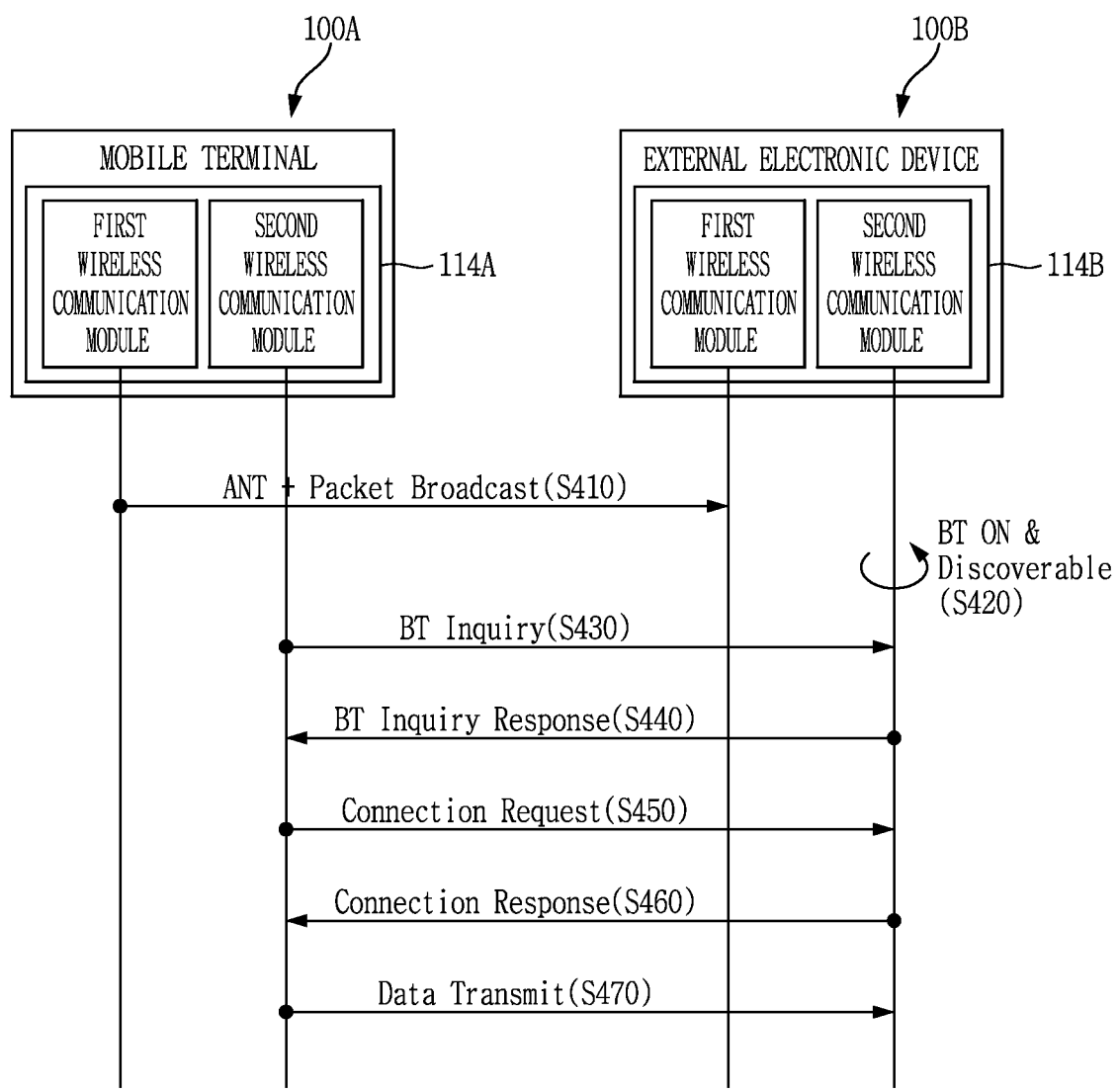

FIGS. 7 and 8 are flow charts illustrating a second embodiment of a control method of a mobile terminal related to the present disclosure.

Referring to FIG. 7, the controller (180 of FIG. 1) of the mobile terminal may search for a specific electronic device among at least one external electronic device using mutually different near field communication modules and perform pairing with the specific electronic device.

The controller (180 of FIG. 1A) may broadcast advertising data and a signal requesting activation of a second wireless communication module included in a communication unit of at least one external electronic device to at least one external electronic device through a first wireless communication module (S310). Here, the controller may set to first wireless communication module to be constantly maintained in an activated state when power is applied.

The first wireless communication module is a near field communication module supporting a low energy technology such as ANT+ and the second wireless communication module refers to a general near field communication module such as an NFC module or a Bluetooth module.

Since the controller performs broadcasting through the first wireless communication module supporting a low energy technology, battery consumption of the terminal may be minimized.

The controller (180 of FIG. 1A) may receive a response regarding the activation request from a specific electronic device among the at least one external electronic device (S320). The specific electronic device may refer to an electronic device that the terminal has authority to access, among electronic devices which have received the broadcast data. The advertising data may be configured as a packet data including a unique company identifier.

When a response regarding the activation request is received, the controller (180 of FIG. 1A) may perform pairing with the specific electronic device through the second wireless communication module (S330) and transmit data to the paired specific electronic device (S340).

The specific electronic device, as at least one electronic device which ha received the advertising data, refers to an electronic device accessible to the terminal. When a response is received from the specific electronic device, the controller may request pairing from the specific electronic device. As the specific electronic device responds to the pairing request, a near field communication channel may be formed.

According to the present disclosure, a low power near field communication module is set to a constantly activated state when power is applied, and when transmission of short-rage data is required, another near field communication module may be selectively activated to perform pairing.

Referring to FIG. 8, the controller (180 of FIG. 1A) of the mobile terminal may activate the second wireless communication module of the specific electronic device to perform pairing and transmit data.

In detail, the controller of the mobile terminal 100A may request advertising data through a first wireless communication module of the communication unit 114A and activation of a second wireless communication module included in the communication unit 114B of the specific electronic device 100B. That is, the controller of the mobile terminal 100A may transmit an ANT+ packet and a signal requesting activation of the second wireless communication module to the specific electronic device 100B using the first wireless communication module driven at low power (S410). Here, it is based upon the premise that the mobile terminal 100A and the specific electronic device 100B will set the first wireless communication module related to the ANT+ technology to an activation state.

When the ANT+ packet and the second wireless communication module activation request signal are received, the specific electronic device 100B activates the second wireless communication module and changes a setting to a state in which a device is able to be searched (S420). Here, the second wireless communication module may be a Bluetooth version 3.0 module, a Bluetooth version 4.0 module, or an NFC module.

When the specific electronic device 100B activates the second wireless communication module and changes the setting to a state in which a device is able to be searched, the controller of the mobile terminal 100A may inquire about whether an existing Bluetooth function is available to be used through the second wireless communication module (S430) and receive a response (S440).

The controller of the mobile terminal 100A performs pairing with the second wireless communication module of the specific electronic device 100B through the second wireless communication module (S450, S460), and transmit data through a paired communication channel (S470).

According to the second embodiment of the present disclosure, among the first wireless communication module driven at low energy and the general second wireless communication module, the first wireless communication module that can be driven at low energy may be set to a constantly activated state and the second wireless communication module may be selectively chanted to an activated state, thereby perform pairing.

Figure 9:
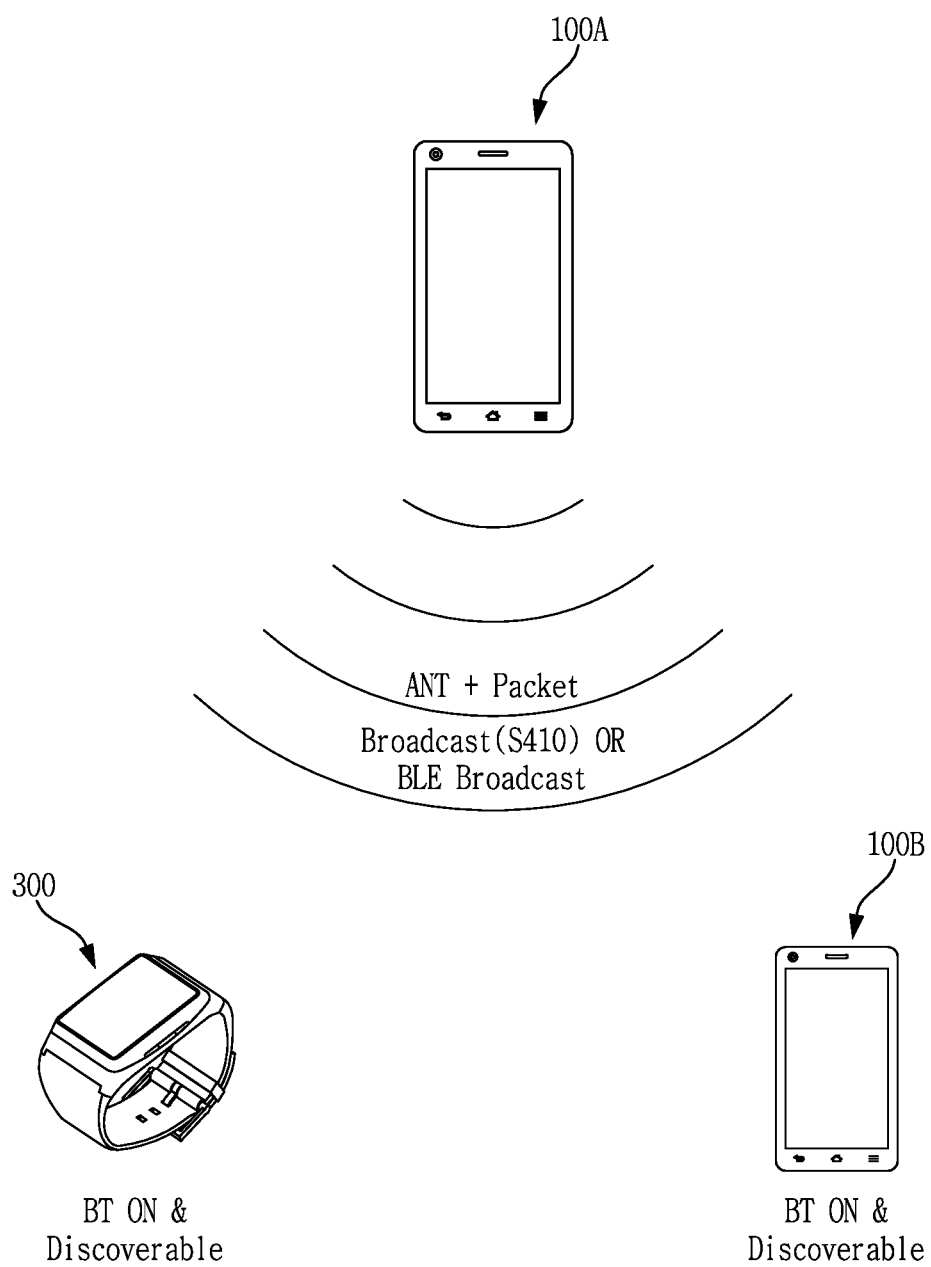
FIG. 9 is a view illustrating a method for broadcasting data from a mobile terminal related to the present disclosure to at least one external electronic device.

FIG. 9 is a view illustrating a method for broadcasting data from a mobile terminal related to the present disclosure to at least one external electronic device.

Referring to FIG. 9, in a state in which a low power near field communication function is constantly activated, the mobile terminal 100A may broadcast an ANT+ packet or a BLE advertising data to at least one external electronic device 300 and 100B.

FIGS. 10 to 13 are views illustrating data transmission between a mobile terminal related to the present disclosure and a watch type mobile terminal.

Figure 10:
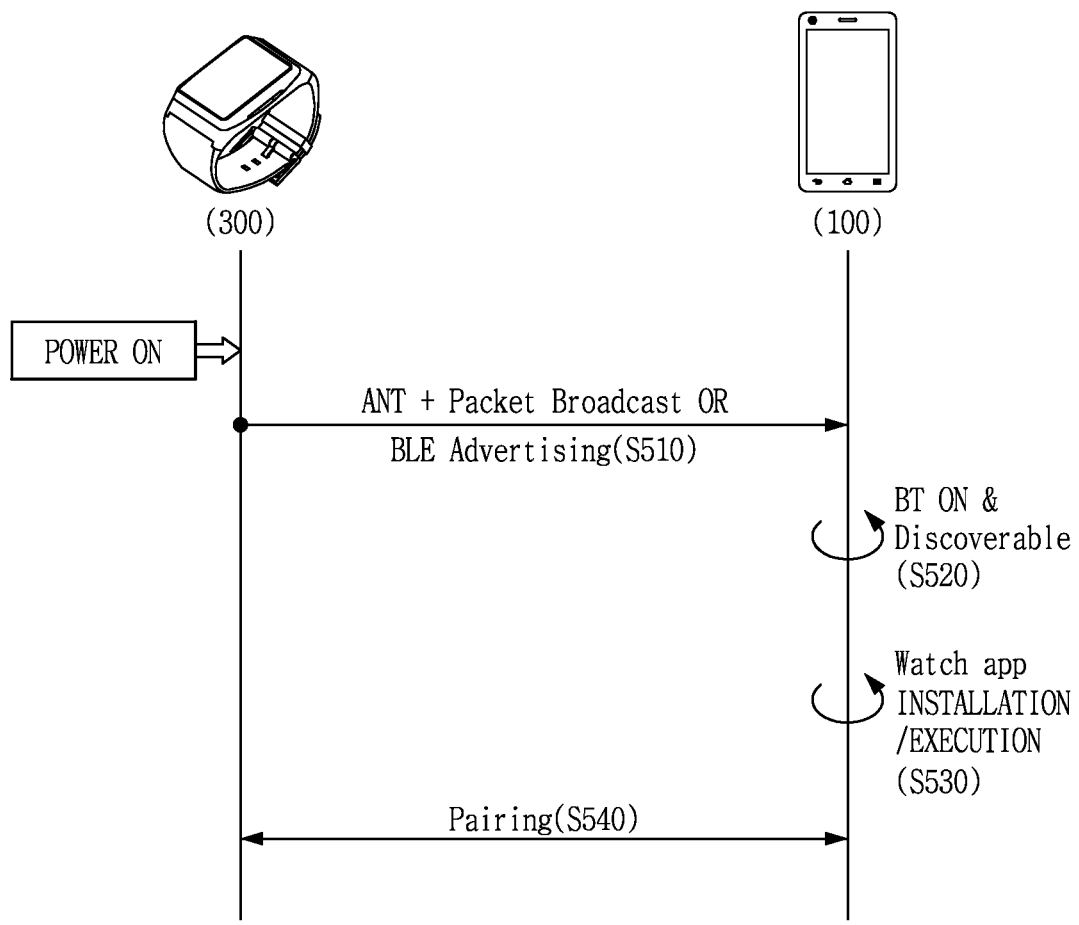
FIGS. 10 to 13 are views illustrating data transmission between a mobile terminal related to the present disclosure and a watch type mobile terminal.

Referring to FIG. 10, a watch type mobile terminal 300 used as a slave device may perform pairing with another mobile terminal 100 serving as a master device.

When power is applied, the watch type mobile terminal 300 may transmit an ANT+ packet or BLE advertising data to the mobile terminal 100 as a master device (S510).

The mobile terminal 100 as a master device may turn on a Bluetooth function and change a setting of the terminal to a search-available state (S520). Also, a specific application for a connection to the watch type mobile terminal as a slave device may be installed or a specific installed application may be executed (S530) to perform pairing (S540). The specific application may be installed in the terminal when the terminal is manufactured.

Figure 11:
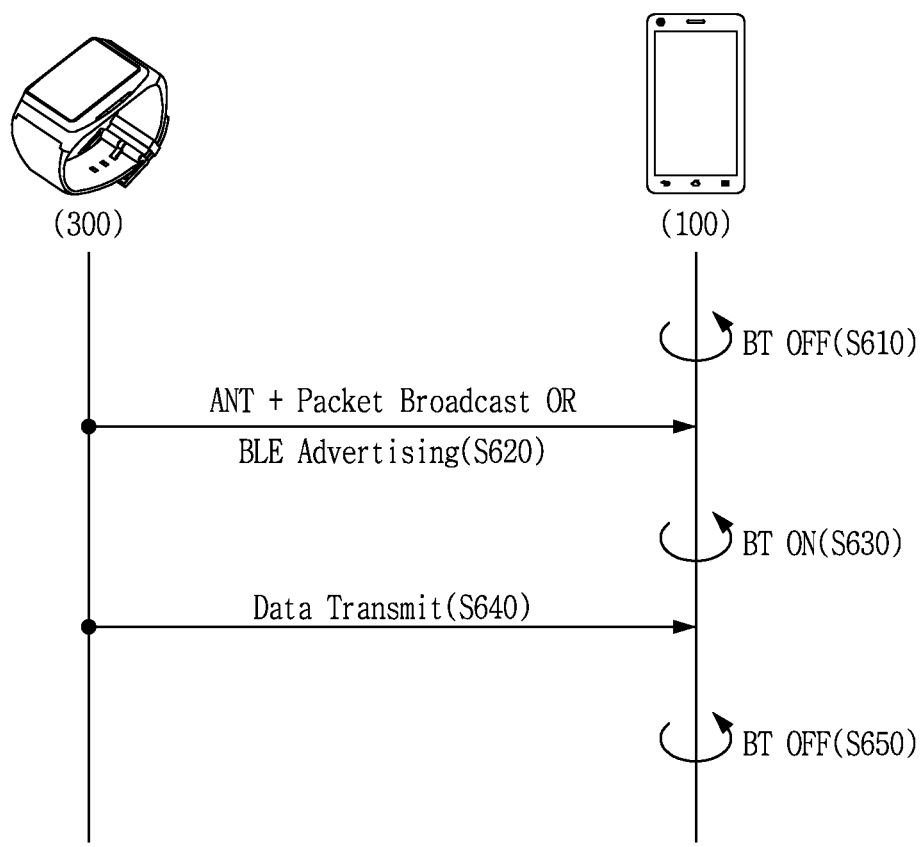

Referring to FIG. 11, a method for the mobile terminal 100 to control ON/OFF of the Bluetooth function after the mobile terminal as a master device and the watch type mobile terminal 300 as a slave device are initially paired is illustrated.

In a state in which the Bluetooth function of the mobile terminal 100 is OFF, when the ANT+ packet or BLE advertising data are received from the watch type mobile terminal 300 (S620), the mobile terminal 100 may turn on the Bluetooth function (S630).

The mobile terminal 100 may transmit data through a previously paired communication channel (S640), and when data is not transmitted during a preset period of time after completion of the data transmission, the Bluetooth function may be turned off (S650).

Figure 12:
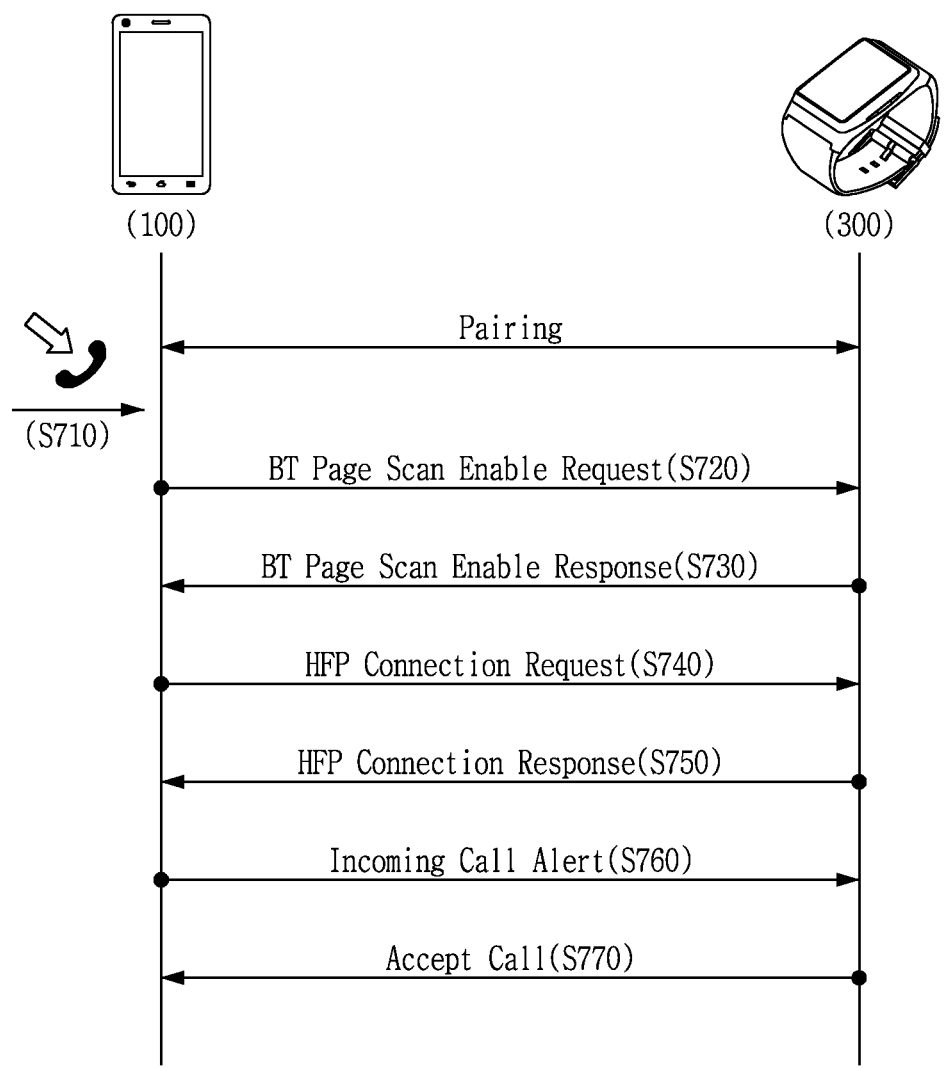

Referring to FIG. 12, when an event is received, the mobile terminal 100 may perform a HFP (Hands Free Profile) connection to the paired watch type mobile terminal 300.

In detail, when an event including at least one of a call reception request, a text message reception request, a notification message reception request, and a streaming data reception request is received (S710), the mobile terminal 100 may perform BT page scan (S720 and S730).

When the Bluetooth function between the mobile terminal 100 and the watch type mobile terminal 300 is ascertained, the HPF connection may be performed (S740 and S750). When the HFP connection is completed, the mobile terminal 100 may transmit an incoming call notification (incoming call alert) to the watch type mobile terminal 300 (S760) and receive a response notification (accept call) (S770).

When the event reception is terminated, the controller of the mobile terminal 100 may terminate (disconnect) the HFP connection formed with the watch type mobile terminal 300. That is, when the event reception is terminated, the controller of the mobile terminal 100 may transmit a control signal terminating the HPF connection to the watch type mobile terminal 300. Also, when a data transmission is stopped for more than a preset period of time, the controller of the mobile terminal 100 or the watch type mobile terminal 300 may automatically terminate the HPF connection.

Figure 13:
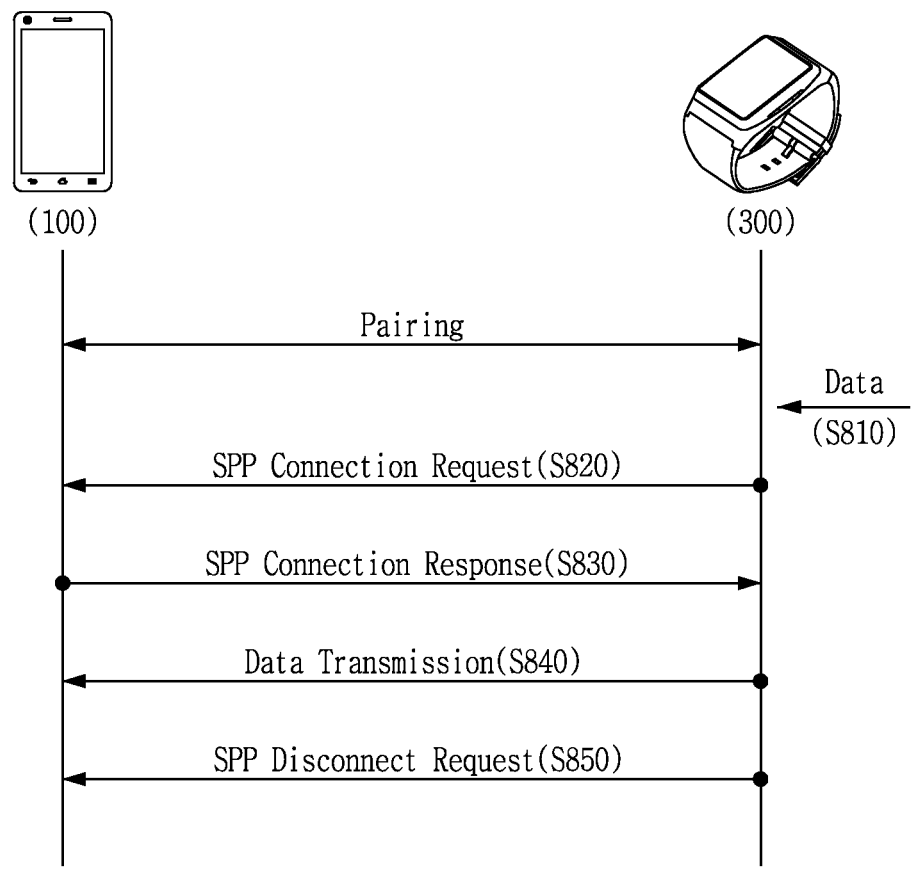

Referring to FIG. 13, when the watch type mobile terminal 300 receives an event, the watch type mobile terminal 300 may perform a serial port profile (SSP) connection to the mobile terminal 100 and transmit data.

In detail, when the watch type mobile terminal 300 receives an event (S810), it may perform an SSP connection (S820 and S830). Here, the event may be a specific input applied through an input unit of the watch type mobile terminal 300.

When the SSP connection is completed, the watch type mobile terminal 300 may transmit the input data to the mobile terminal 100 (S840), and when transmission of the input data is completed, the watch type mobile terminal 300 may terminate the SSP connection (S850). The SSP connection may be terminated according to a request from the watch type mobile terminal 300 or may be terminated by coupling a data transmission stop time of both terminals.

Figure 14:
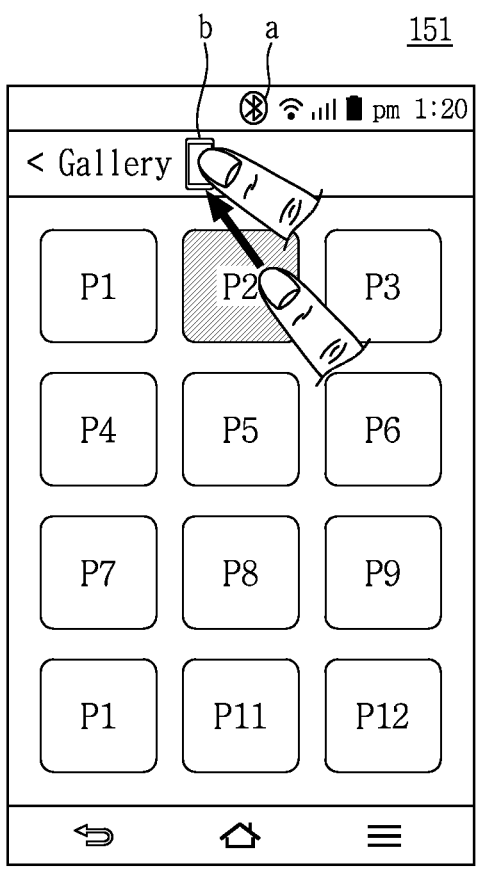
FIG. 14 is a view illustrating a method for transmitting data from a mobile terminal related to the present disclosure to a paired specific electronic device through a user interface.

FIG. 14 is a view illustrating a method for transmitting data from a mobile terminal related to the present disclosure to a paired specific electronic device through a user interface.

Referring to FIG. 14, when pairing with a specific electronic device is completed, the controller (180 of FIG. 1A) of the mobile terminal may display a first icon b representing the specific electronic device on the display unit (151 of FIG. 1A).

Also, the controller may further display a second icon a indicating an activated state of the second layer or an activated state of the second wireless communication module.

When the user applies an input of selecting a specific content P2 from among contents P1 to P12 displayed on the display unit and dragging it to the first icon b, the controller may transmit the specific content P2 to a specific electronic device using a Bluetooth technology.

According to the present disclosure, the low energy near field communication technology is set to a constantly activated state when power is applied, a specific electronic device available for short-range data communication is searched using the low-energy near field communication technology, and when the specific electronic device is discovered, pairing may be performed by selectively activating another near field communication technology.

Also, according to the present disclosure, after pairing is performed, when a data transmission is stopped for more than a set period of time, the near field communication function is deactivated, and when a new event occurs, the near field communication function of the paired specific electronic device may be controlled to be activated using the low energy near field communication technology.

Figure 15:
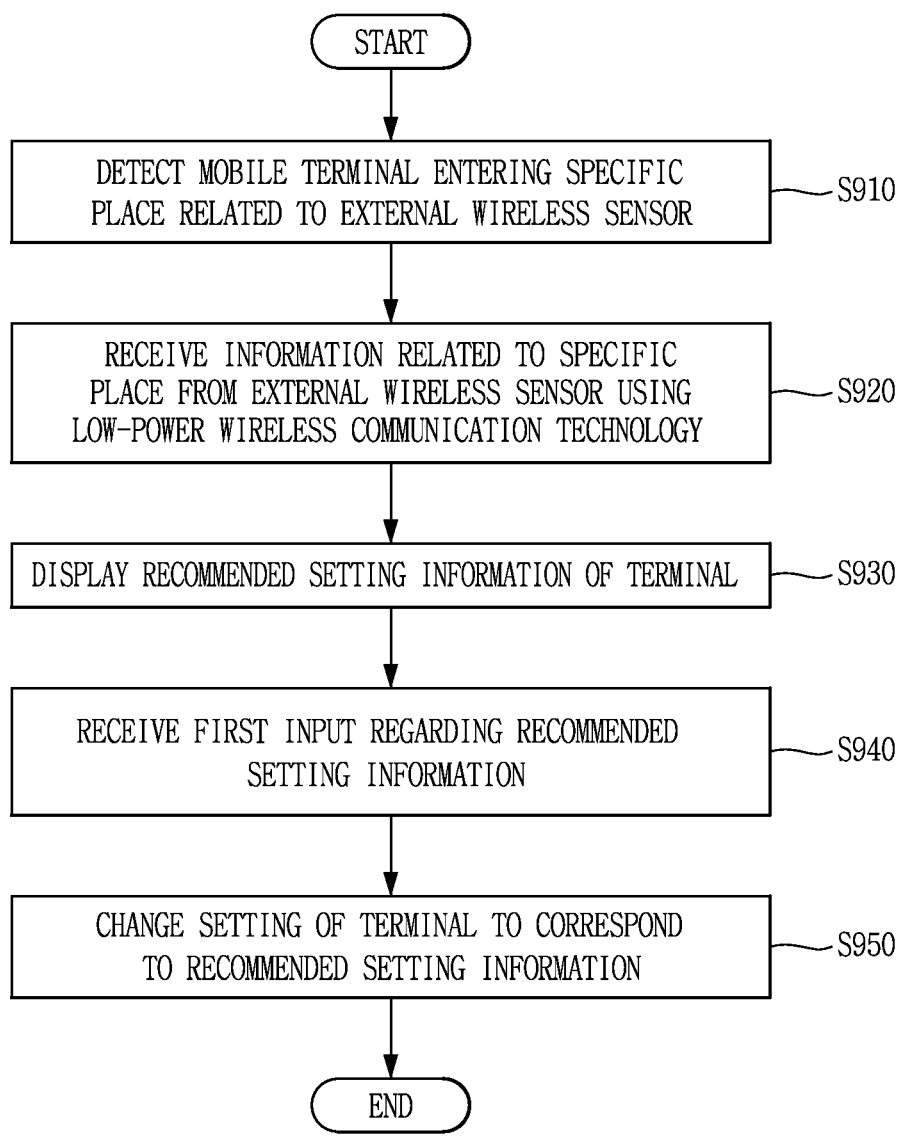
FIG. 15 is a flow chart illustrating a third embodiment of a control method of a mobile terminal related to the present disclosure.

FIG. 15 is a flow chart illustrating a third embodiment of a control method of a mobile terminal related to the present disclosure, and FIGS. 16 to 24 are views illustrating the third embodiment of a control method of a mobile terminal related to the present disclosure.

Referring to FIG. 15, the controller (180 of FIG. 1A) of the mobile terminal may detect the mobile terminal entering a specific place related to an external wireless sensor (S910) and receive information related to the specific place from the external wireless sensor using a low power wireless communication technology (S920).

The controller of the mobile terminal sets a lower power wireless communication module to be constantly maintained in an ON state when power is applied, based on which descriptions will be made.

The low power wireless communication technology refers to a near field communication technology in which power consumption is less than a reference value (e.g., 15 mA), such as Bluetooth low energy of Bluetooth version 4.0 or ANT+. The external wireless sensor may include a sensor using a low power wireless communication technology or an electronic device having a sensor. For example, the external wireless sensor may be a beacon having an indoor positioning platform and a Bluetooth version 4.0.

When the mobile terminal approaches the external wireless sensor within a predetermined radius, the controller may receive information related to the specific place from the external wireless sensor. The information related to the specific place may include at least one of position information (or indoor positioning information) of a place where data communication is available by the lower power wireless communication technology used by the external wireless sensor, a wireless communication module or an external electronic device that may be used in the specific place, and identification name corresponding to the specific place.

The controller (180 of FIG. 1A) may determine recommended setting information of the terminal using the received information related to the specific place and display the same (S930).

In detail, the controller may determine whether to turn on or off a function of each of a plurality of modules installed in the terminal using the information related to the specific place and display setting information of each module as recommended setting information. For example, in a case in which information related to the specific place that an NFC module and a Wi-Fi module are present in the specific place is received, the controller may display recommended setting information of the terminal to turn on a NFC and Wi-Fi function. That is, the controller may determine the recommended setting information such that a function related to the wireless communication module included in the information related to the specific place and the external electronic device is activated.

For example, the setting information may be at least one of brightness of a screen, vibration, Wi-Fi, GPS (Global Positioning System), Bluetooth, NFC (Near Field Communication), Miracast, and speaker mode.

In a case in which a first input regarding the displayed recommended setting information is received (S940), the controller (180 of FIG. 1A) may change a setting of the terminal to correspond to the recommended setting information (S950).

In a case in which a lock screen is displayed on the display unit, the controller may display the recommended setting information on the lock screen, and in a case in which a home screen is displayed on the display unit, the controller may display the recommended setting information on the home screen. Also, the controller may display the recommended setting information together with current setting information of the terminal on a notification bar.

In a case in which a first input regarding the recommended setting information displayed on the display unit is received, the controller may change and set the setting information of the terminal to the displayed recommended setting information. Here, the first input may be a continuous touch input applied to a region in which the recommended setting information is displayed, in a first direction.

Also, in a case in which the recommended setting information is displayed on a lock screen of the display unit, the controller (180 of FIG. 1) may generate and display the recommended setting information in the form of a specific icon releasing the lock screen. In a case in which a first input applied to the specific icon is received, the controller may release the lock screen and change a setting of the terminal to correspond to the recommended setting information. In a case in which an input, rather than the first input, is applied to the specific icon to release the lock screen, the controller may not change the setting information of the terminal.

The controller (180 of FIG. 1A) may connect the recommended setting information to position information of a specific place and store the same in the memory (170 of FIG. 1A). When the terminal enters a specific place stored in the memory (170 of FIG. 1A), the controller may automatically change the setting of the terminal to the stored recommended setting information corresponding to the specific place. That is, in a case in which the recommended setting information regarding the specific place is stored in the memory, the controller may automatically change the setting of the terminal to the stored recommended setting information even though the first input is not received from the user. Meanwhile, in a case in which the recommended setting information regarding the specific place has not been stored in the memory, the controller may display the recommended setting information on the display unit and, only when the first input is received, the controller may change the setting of the terminal.

In a case in which the setting information of the terminal is changed to the recommended setting information, the controller may display an indicator in a specific area of the display unit. For example, the controller may display an indicator indicating that the setting of the terminal has been changed to the recommended setting information in a status bar of the display unit.

Also, in a case in which the recommended setting information regarding the specific place has been stored in the memory (170 of FIG. 1A), the controller (180 of FIG. 1A) may delete the recommended setting information stored in the memory in order to prevent the setting information from being automatically changed when the terminal enters the specific place. In detail, when a second input regarding the recommended setting information displayed on the display unit is received, the controller (180 of FIG. 1A) may delete the recommended setting information connected to the position information of the specific place stored in the memory. Here, the second input may be a continuous touch input applied in a direction opposite to that of the first input.

In a case in which a third input regarding specific setting information among recommended setting information displayed on the display unit (151 of FIG. 1A) is received, the controller (180 of FIG. 1A) may change the specific setting information according to the third input and display recommended setting information including the changed specific setting information on the display unit (151 of FIG. 1A). In detail, the recommended setting information may include information regarding a plurality of functions provided in the terminal such as NFC, WiFi, GPS, Bluetooth, Vibrate, and the like, and the controller may switch on or off a function of specific setting information through the third input (a touch input or a drag input) regarding the specific setting information.

Also, in a case in which a fourth input is received through the display unit (151 of FIG. 1A), the controller (180 of FIG. 1A) may determine whether the terminal enters a specific place. When it is determined that the terminal has not entered a specific place, the controller may search for an external wireless sensor accessible by BLE through the wireless communication unit (110 of FIG. 1A) and request information related to the specific place from the searched external wireless sensor. In a case in which a current position of the terminal is not a specific place managed by the external wireless sensor but is within a distance over which the terminal is able to perform Bluetooth communication with the external wireless sensor, the controller may display recommended setting information related to the communication-available external wireless sensor on the display unit so that the user may select whether to change setting information of the terminal. Here, in a case in which the user changes a setting of the terminal to the recommended setting information displayed on the display unit, the controller may provide a user interface so that the current position of the terminal and the recommended setting information may be stored by a specific name.

In a case in which information related to two or more specific places which at least partially overlap each other is received, that is, in a case in which information related to different specific places which partially overlap each other is received from two or more external wireless sensors, the controller (180 of FIG. 1A) may select information related to one specific place according to signal strength of the information related to two or more specific places and determine recommended setting information.

In a case in which the terminal moves out of the specific place, the controller (180 of FIG. 1A) may recover the setting of the terminal to the previous state.

Figure 16:
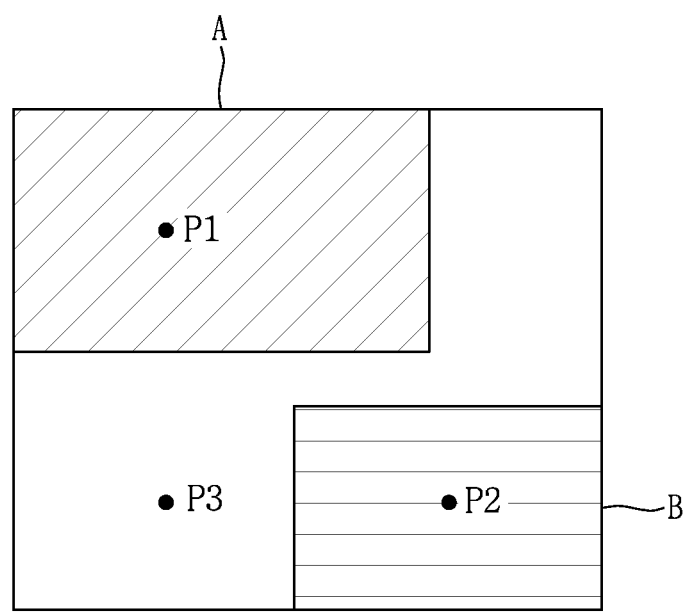

FIG. 16 is a view illustrating whether a mobile terminal related to the present disclosure enters a specific place.

Referring to FIG. 16, an external wireless sensor may check whether BLE communication is possible within a range of a specific place and whether the mobile terminal enters the specific place by periodically broadcasting a control signal to the mobile terminal. For example, a first wireless sensor may check whether BLE is possible within a range of a region A and whether the mobile terminal A enters the region A by periodically broadcasting a control signal. Similarly, a second wireless sensor is able to perform BLE within a range of a region B and check whether the mobile terminal enters the region B by periodically broadcasting a control signal. The first wireless sensor or the second wireless sensor may transmit information regarding an identification name (A or B) of the specific place, position information (latitude and longitude of the slanted area and indoor positioning coordinates), a wireless communication module that may be used in the specific place, an external electronic device, and the like, to the mobile terminal.

When the mobile terminal is positioned in a point P3, the mobile terminal may not be able to receive a control signal from the first wireless sensor and the second wireless sensor, but when the mobile terminal moves to a point P1, the mobile terminal may be able to receive a control signal from the first wireless sensor. In this case, the controller may receive information related to the region A from the first wireless sensor, and may recognize that the terminal has entered the region A.

Figure 17:
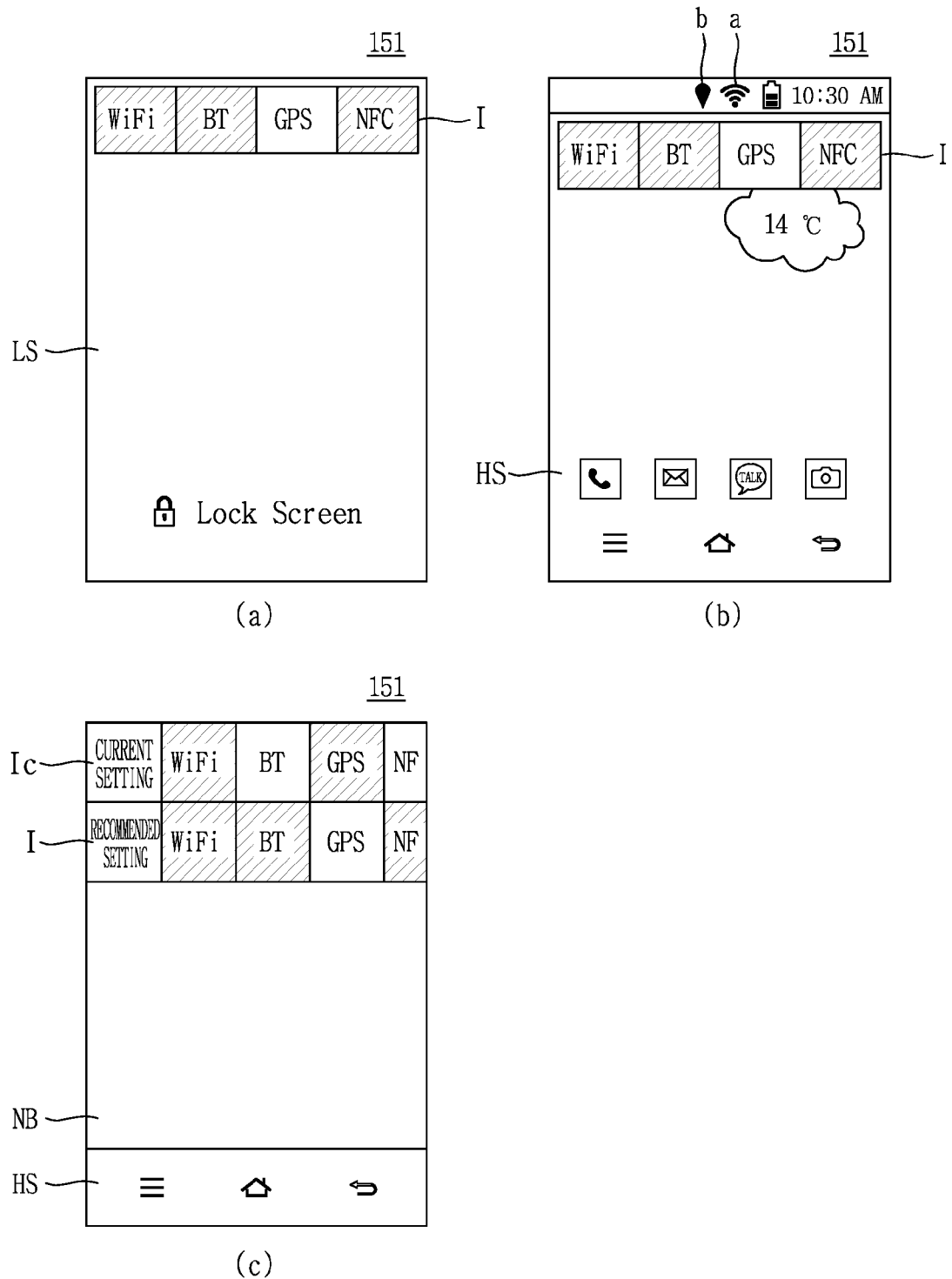

FIG. 17 is a view illustrating a method for displaying recommended setting information when the mobile terminal related to the present disclosure enters the specific place, FIG. 8 is a view illustrating a first input regarding recommended setting information displayed on a mobile terminal related to the present disclosure, and FIG. 9 is a view illustrating a change in setting of a mobile terminal related to the present disclosure to recommended setting information.

Referring to FIG. 17, when the terminal enters a specific place, the controller (180 of FIG. 1A) may receive information related to the specific place from an external wireless sensor and display recommended setting information I on the display unit 151 using the information related to the specific place.

The controller may generate the recommended setting information I to activate a Wi-Fi, BT, NFC function of the terminal and deactivate a GPS function of the terminal using information related to a specific place, for example, using information indicating that Wi-Fi, BT, and NFC function is available to be used in the specific place and the GPS function is not available to be used in the specific place.

In a cased in which a lock screen LS is displayed on the display unit 151, the controller may display recommended setting information I on the lock screen LS ((a) of FIG. 17). In a case in which a home screen HS is displayed on the display unit 151, the controller may display the recommended setting information I on the home screen HS ((b) of FIG. 17).

Also, in a case in which a notification bar NB is slidably displayed in an upper portion of the home screen HS of the display unit 151, the controller may display the recommended setting information I below a region in which current setting information Ic of the terminal in the notification bar NB is displayed.

Figure 18:
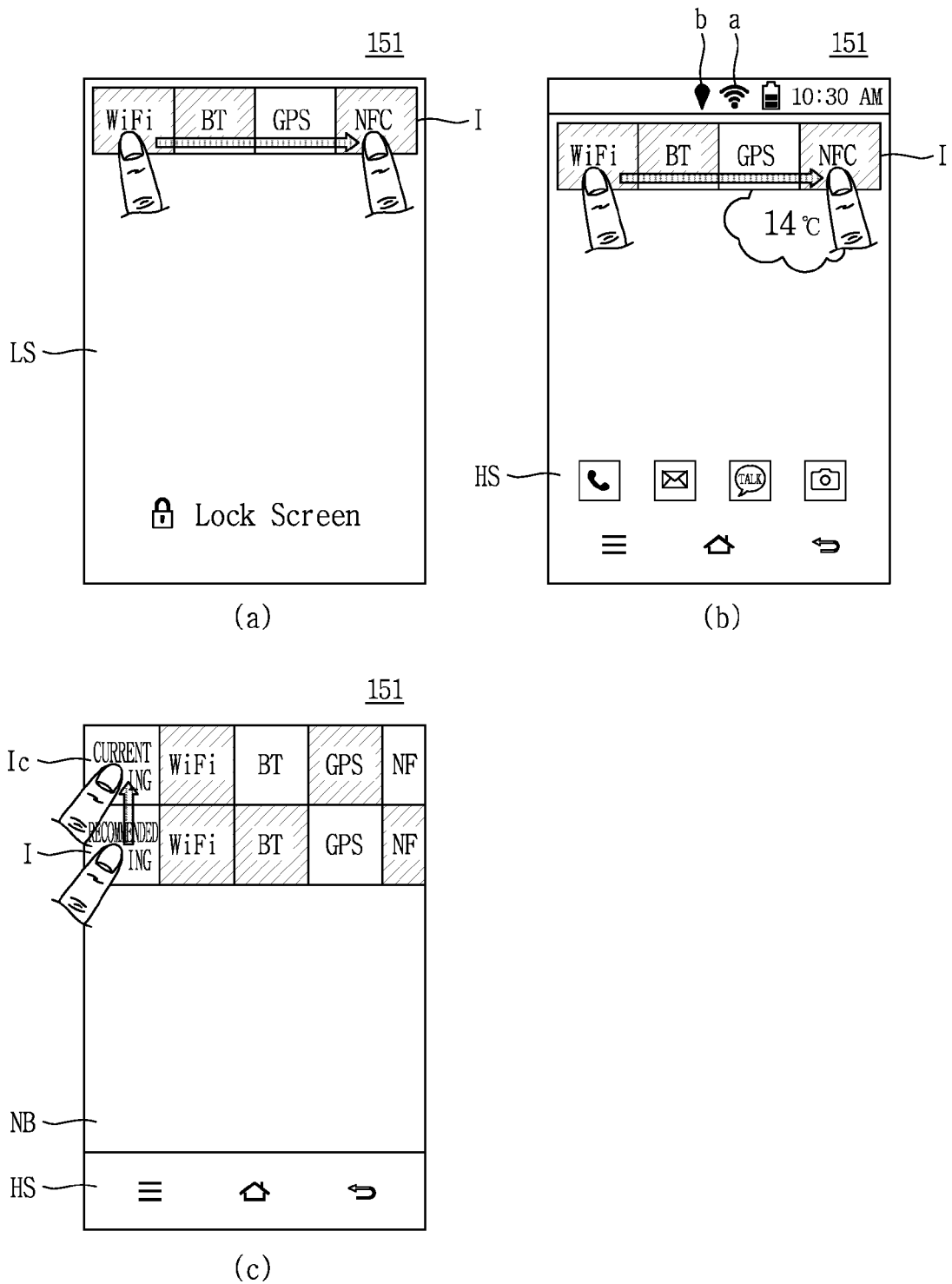

Referring to FIG. 18, in a case in which a first input regarding the recommended setting information I is received, the controller (180 of FIG. 1) may change a setting of the terminal to the recommended setting information. Here, the first input may be an input dragging a region in which the recommended setting information is displayed, in a first direction.

In a case in which the recommended setting information I is displayed on the lock screen LS and a drag input applied to the recommended setting information I is received, the controller may release displaying of the lock screen LS and change a setting of the terminal to the recommended setting information I.

In a case in which the recommended setting information I is displayed on the notification bar NB, the controller may change a setting of the terminal to the recommended setting information I through a drag input applied from a region (start point) in which the recommended setting information I is displayed to a region (end point) in which the current setting information Ic is displayed.

Figure 19:
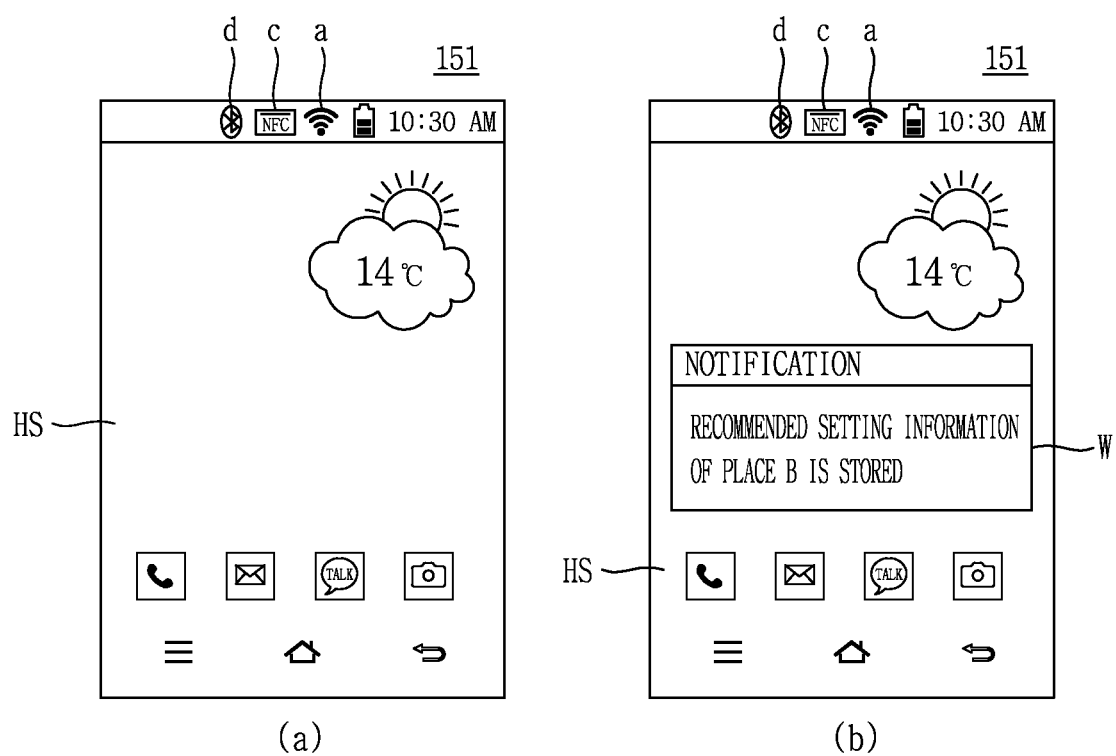

Referring to FIG. 19, in a case in which the setting of the terminal has been changed to the recommended setting information or in a case in which the recommended setting information is stored in the memory (170 of FIG. 1A), the controller (180 of FIG. 1A) may display the changed contents on the display unit 151.

In a case in which the setting of the terminal has been changed to the recommended setting information, the controller may display indicators a, c, and d respectively corresponding to activated functions in a status bar ((a) of FIG. 19).

Also, in a case in which the recommended setting information is stored in association with a specific place A in the memory, the controller may display a notification window W storing recommended setting information of the place A on the display unit 151.

Figure 20:
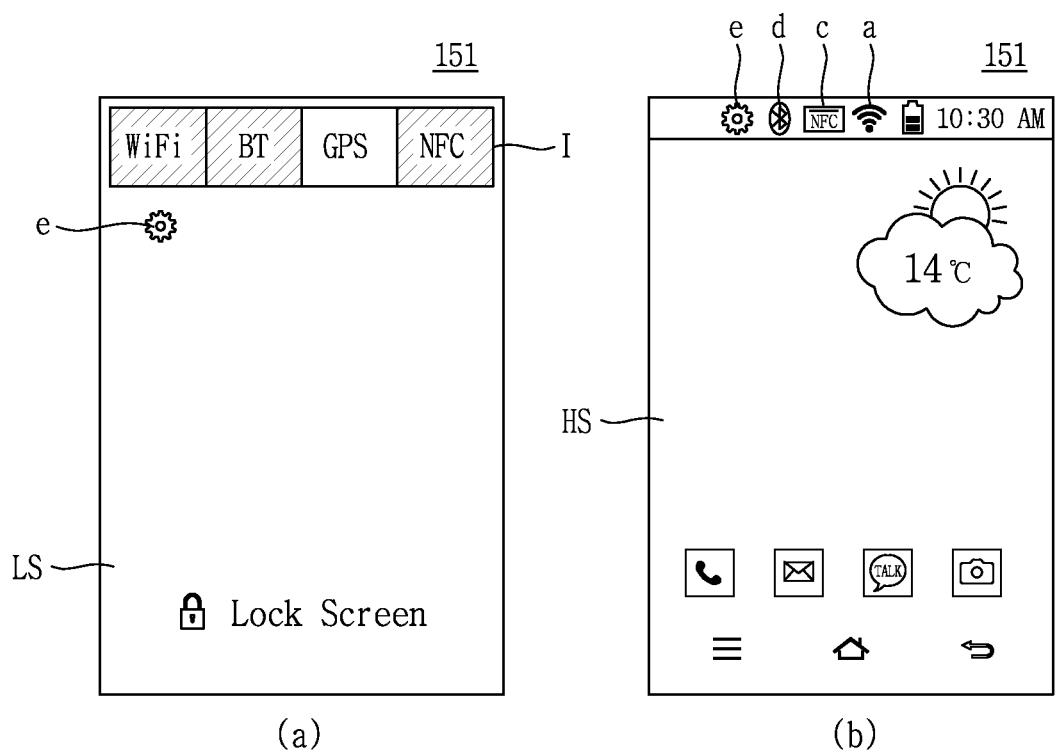
Figure 21:
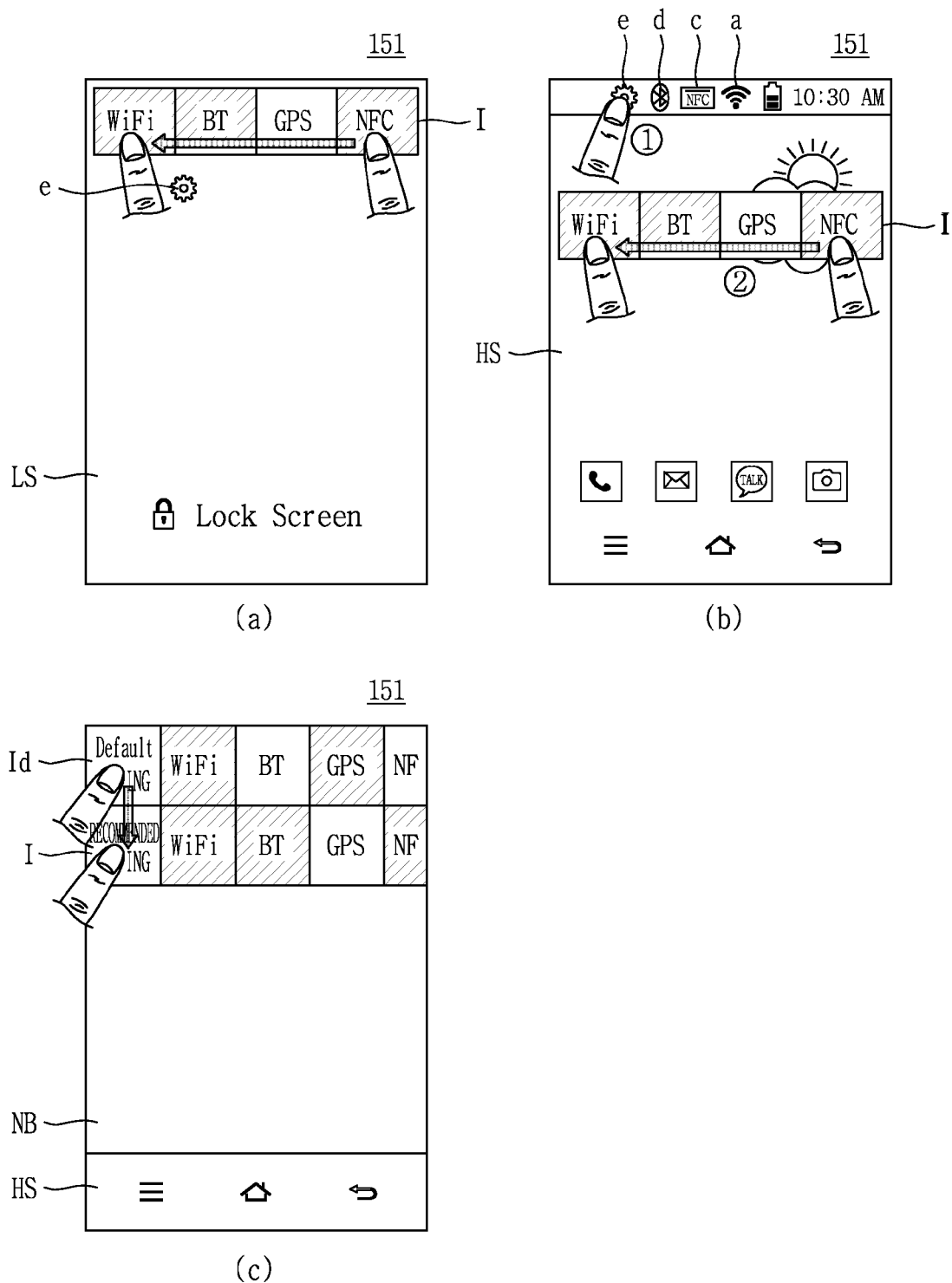
Figure 22:
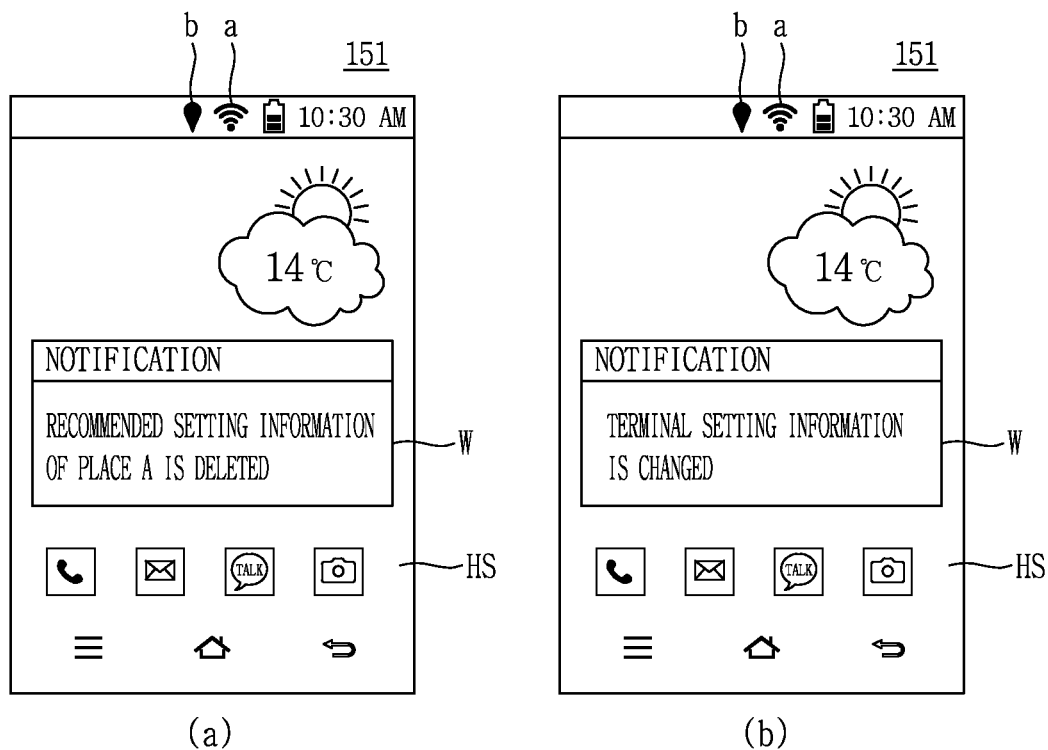

FIG. 20 is a view illustrating a case in which a setting of a mobile terminal related to the present disclosure is automatically changed, and FIGS. 21 and 22 are views illustrating a method for deleting recommended setting information stored in the mobile terminal related to the present disclosure, and FIG. 23 is a view illustrating a method for changing recommended setting information of the mobile terminal related to the present disclosure or changing display.

Referring to FIG. 20, when the terminal enters a specific place and recommended setting information regarding the specific place is stored in the memory (170 of FIG. 1A), the controller (180 of FIG. 1A) may automatically change a setting of the terminal and display an indicator e indicating the automatic change.

In a case in which a home screen HS is displayed on the display unit 151, the controller may display the indicator e indicating automatic change in a status bar ((a) of FIG. 20), and in a case in which a lock screen LS is displayed on the display unit 151, the controller may display the indicator e indicating automatic change on the lock screen LS ((b) of FIG. 20). Here, the controller may display the automatically changed recommended setting information I together with the indicator e on the lock screen LS.

Thus, in a case in which recommended setting information regarding the specific place has been stored in the memory an the terminal has entered the specific place, the controller may automatically change the setting of the terminal to the recommended setting information regardless of a user input, and when the terminal moves out of the specific place, the controller may recover the previous setting of the terminal.

Referring to FIG. 21, the controller (180 of FIG. 1A) may delete the recommended setting information I related to the specific place stored I n the memory (170 of FIG. 1A) THROUGH A SECOND INPUT. Here, the second input for deleting the recommended setting information I stored in the memory may be a drag input applied in a direction opposite to that of the first input for storing the recommended setting information I.

In a case in which the recommended setting information related to the specific place has been stored in the memory and the terminal enters the specific place, the controller may automatically change a setting of the terminal to the recommended setting information I and display an indicator e indicating automatic change.

The controller may delete the recommended setting information stored in the memory through a drag input regarding the recommended setting information I displayed together with the indicator e indicating automatic change ((a) of FIG. 21).

In a case in which only the indicator e indicating automatic change is displayed on the display unit, the controller may display the recommended setting information through a touch input ① applied to the indictor e and subsequently delete the recommended setting information I stored in the memory through a drag input ② applied to the recommended setting information I ((b) of FIG. 21).

In a case in which a notification bar NB is displayed on the home screen HS, the controller may delete the recommended setting information I stored in the memory through a drag input applied from a region (start point) in which default setting information Id of the notification bar to a region (end point) in which the recommended setting information I is displayed ((b) of FIG. 21).

In a case in which the recommended setting information I stored in the memory is deleted, the controller may change a setting of the terminal to the default setting information.

Referring to FIG. 22, in a case in which the recommended setting information stored in the memory (170 of FIG. 1A) is deleted or in a case in which the setting information of the terminal has been changed, the controller (180 of FIG. 1) may display changed contents in a notification window W.

In a case in which recommended setting information related to a place A stored in the memory is deleted, the controller may change the setting of the terminal to the default setting information and display changed setting functions as indicators a and b in the status bar. Also, the controller may display a notification window W indicating that the recommended setting information of the place A has been deleted ((a) of FIG. 22).

In a case in which the setting information of the terminal is changed, the controller may display a notification window W indicating that the setting information has been changed ((b) of FIG. 22).

Referring to FIG. 23, the controller (180 of FIG. 1A) may change an activation state of specific setting information among recommended setting information displayed on the display unit (151 of FIG. 1A) or change display of the recommended setting information.

The controller may change an activation state of a BT function through a touch input applied to a region in which the activation state of the BT function is displayed in the recommended setting information I including Wi-Fi, BT, GPS, and NFC functions. In detail, in a case in which a touch input is received with the BT function activated, the controller may change the BT function to a deactivation state ((a) of FIG. 23).

In a case in which a function other than the Wi-Fi, BT, GPS, and NFC functions is included in the recommended setting information I, the controller may display indicators s and p indicating that there is functions other than the recommended setting information I displayed on the display unit, in a region in which the recommended setting information I is displayed. For example, in a case in which another function is further included next the NFC function, the controller may display an indicator s, and when a touch input applied to the indicator s is received, the controller may move the recommended setting information I in a direction opposite to a direction indicated by the indicator s and subsequently display other specific setting information Vibrate ((b) of FIG. 23).

In a case in which a drag input applied from a region (start point) in which an activation state of the GPS function in the current setting information Ic displayed in the notification bar is displayed to a region (end point) in which activation state of the GPS function in the recommended setting information I is displayed is received, the controller may change the recommended GPS information to the current GPS information and display the same ((c) of FIG. 23).

Figure 24:
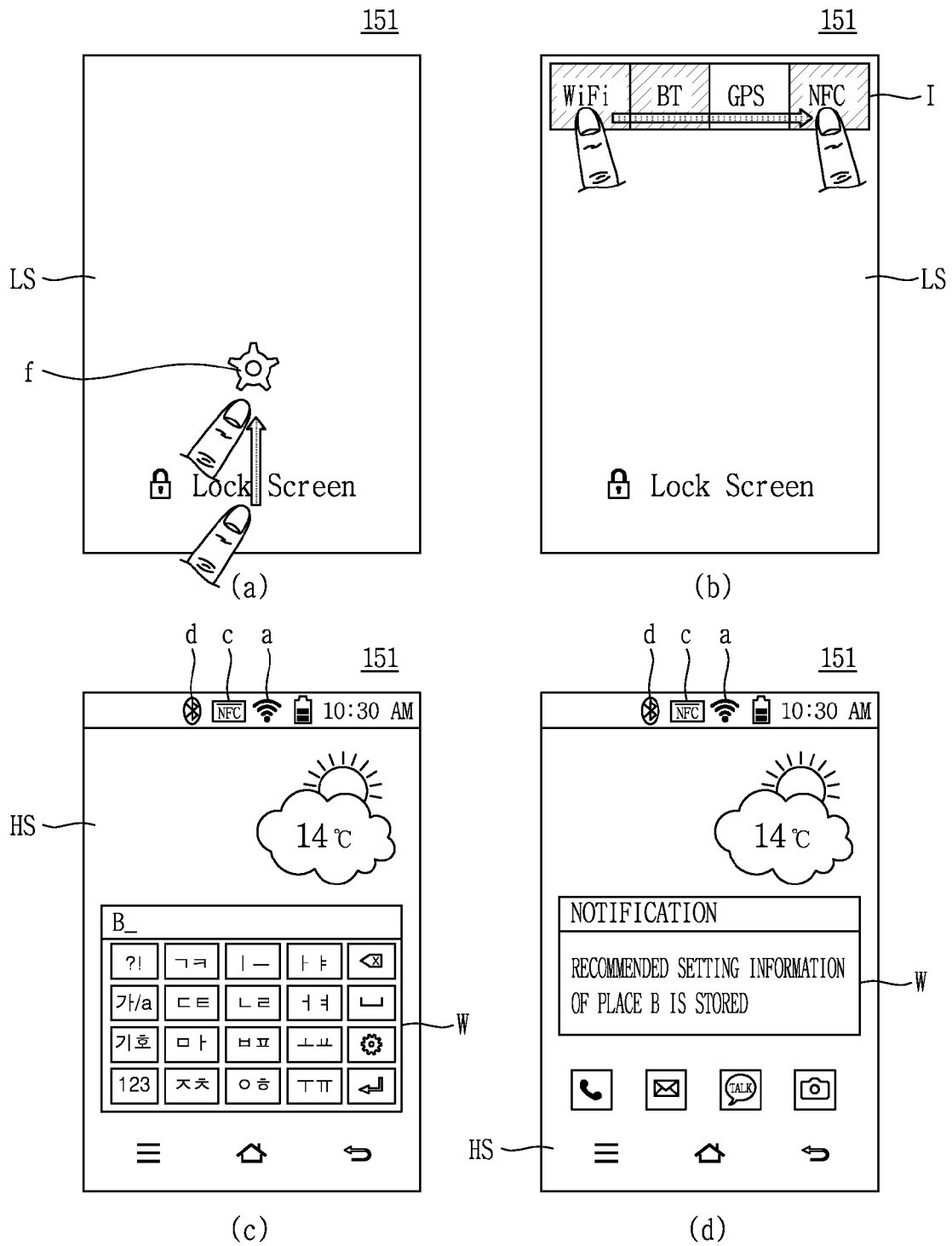

FIG. 24 is a view illustrating a method for manually storing a specific place and recommended setting information in a mobile terminal related to the present disclosure.

Referring to FIG. 24, in a case in which a fourth input is received through the display unit, the controller (180 of FIG. 1A) may determine whether the terminal enters a specific place. When it is determined that the terminal has not entered the specific place, the controller may search for an external wireless sensor accessible by BLE through the wireless communication unit (110 of FIG. 1A). Here, the fourth input may be a drag input applied from one edge of the display unit 151 toward a center of the display unit 151.

In a case in which the fourth input is received, the controller may display a specific indicator I at an end point of the fourth input, while searching for whether to enter a specific place. In a case in which an accessible external wireless sensor is searched, the controller may request information related to the specific place from the searched external wireless sensor, display recommended setting information I using received information related to the specific place, and display the same on the display unit.

In a case in which the fourth input is received with the display unit in a lock screen LS state, the controller may display a specific indicator f and recommended setting information I on the lock screen LS.

In a case in which a first input applied to the recommended setting information I is received, the controller may store current position information of the terminal and the recommended setting information I by linking them. Here, the controller may provide a user interface (e.g., a keypad) allowing the user to directly input an identification name representing the current position information and the recommended setting information I.

In a case in which B is input through the user interface, the controller may store current position information of the terminal and the recommended setting information in the memory by linking them to the place B and display a notification window W indicating the same.

For example, in a case in which the terminal is positioned in a point P3 of FIG. 16, the terminal has not entered the place A or B, and thus, even though information related to a specific place is received from an external wireless sensor installed in the place A or B is received, the controller does not display the information as recommended setting information.

However, when the fourth input is received through the display unit and information related to a specific place is received by the terminal position in the point P3, the information related to the specific place may be used as information regarding the point P3. A Bluetooth communication-available range of the external wireless sensor may be different from position information of a specific place stored in each wireless sensor, and thus, the controller may change a setting of the terminal using information related to an adjacent specific place.

According to the present disclosure, since an external wireless sensor may be recognized using BLE, battery consumption is reduced and, since recommended setting information is provided using information related to a place received from an external wireless sensor, a setting of the terminal may be easily changed to be appropriate for an environment.

Figure 25:
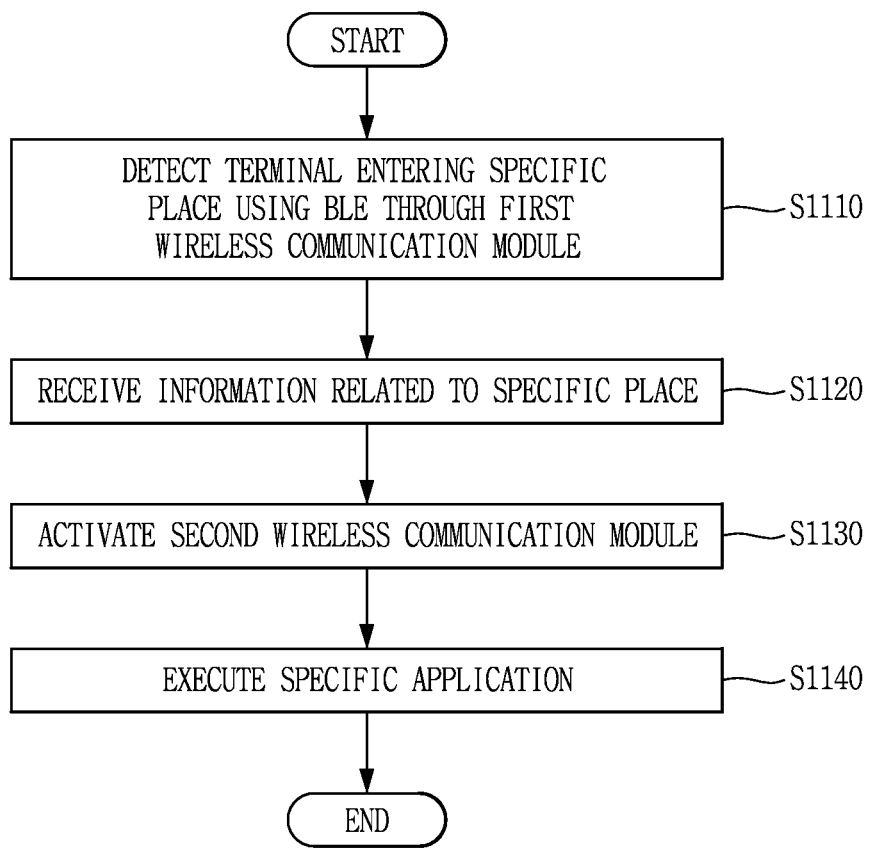
FIG. 25 is a flow chart illustrating a fourth embodiment of a control method of a mobile terminal related to the present disclosure.

FIG. 25 is a flow chart illustrating a fourth embodiment of a control method of a mobile terminal related to the present disclosure, and FIGS. 26 to 36 are views illustrating the fourth embodiment of a control method of a mobile terminal related to the present disclosure.

Referring to FIG. 25, the controller (180 of FIG. 1A) may detect the terminal entering a specific place from an external wireless sensor through a first wireless communication module using BLE (S1110).

The first wireless communication module is a module supporting BLE wireless communication, which is able to support both BLE and existing Bluetooth technology. At the time of initial setting (e.g., power is applied). The first wireless communication module may set the existing Bluetooth technology to a deactivated state and the BLE wireless communication technology to an activated state. Thus, the mobile terminal may use the BLE wireless communication technology, while minimizing battery consumption. The BLE wireless communication technology refers to a near field communication technology in which power consumption is less than a reference value (e.g., 15 mA), like BLE of Bluetooth version 4.0 or ANT+.

The external wireless sensor may include a sensor using a low power wireless communication technology or an electronic device having a sensor. For example, the external wireless sensor may be a beacon having an indoor positioning platform and a Bluetooth version 4.0.

In a case in which signal sensitivity received from an external wireless sensor through the first wireless communication module is a set value or greater, the controller may determine that the terminal has entered a specific place.

The controller (180 of FIG. 1) may receive information related to the specific place from an external wireless sensor (S1120).

In a case in which signal sensitivity having a set value or greater is sensed from an external wireless sensor, for example, in a case in which the mobile terminal approaches the external wireless sensor within a predetermined radius, the controller may receive information related to a specific place from the external wireless sensor. The information related to the specific place may include at least one of position information (or indoor positioning information) of a place where data communication is available by the lower power wireless communication technology used by the external wireless sensor, a second wireless communication module or an external electronic device that may be used in the specific place, and identification name corresponding to the specific place.

In a case in which terminal entering a specific place is detected and information related to the specific place is received, the controller (180 of FIG. 1A) may control the second wireless communication module to be activated (S1130).

The second wireless communication module refers to a communication module performing near field communication distinguished from BLE, and may be a module related to an existing Bluetooth technology among a near field communication (NFC) module, a Wi-Fi module, and a first wireless communication module.

The first wireless communication module and the second wireless communication module are generally formed as separate modules, but in a case in which the BLE of Bluetooth version 4.0 and the Bluetooth version 3.0 as the existing Bluetooth technology are used, they may be formed as separate physical layers in a single module.

When it is determined that a position information of the mobile terminal is included within a position information range of a specific place using information related to the specific place received from an external wireless sensor, the controller may control the second wireless communication module to be automatically activated. Also, when the terminal enters to a set distance range from an external electronic device (e.g., an external electronic device having the second wireless communication module) positioned in the specific place among information related to the specific place received from the external wireless sensor, the controller may control the second wireless communication module to be automatically activated. Here, the position information of the specific place may be position information previously stored in the memory.

The controller (180 of FIG. 1A) may execute a specific application related to the second wireless communication module (S1140). Here, the specific application refers to an application capable of performing payment through the second wireless communication module, and card information used for payment may be registered in the application in advance.

The controller (180 of FIG. 1A) may display an execution screen of the specific application on the display unit (151 of FIG. 1A). The execution screen of the specific application may include at least one of card information, information related to a specific place, and goods information, and payment information. Here, the information related to a specific place may be a map of the specific place, position information of an external electronic device installed in the specific place, and the like.

The controller (180 of FIG. 1A) may automatically select card information to be used for payment among at least one card information stored in the specific application using the information related to the specific place. When a plurality of pieces of card information are stored in the specific application, the controller may select one of the plurality of pieces of card information, as representative card information, using information related to the specific place, for example, information related to a card such as a discount card, a point card, and the like, that may be used in the specific place. Even when one of the plurality of pieces of card information has been stored as representative card information, the controller may automatically change the representative card information using the information related to the specific place. The representative card is a card used for payment through the second wireless communication module, among a plurality of cards, and may also be called a default card. Also, the controller may select specific card information from among the plurality of pieces of card information stored in the specific application, according to a user input, and set the selected card information as representative card information.

When it is sensed that position information of the mobile terminal is not within the specific place, the controller (180 of FIG. 1A) may control the second wireless communication module to be deactivated. Here, the specific place may be within position information range received from an external wireless sensor or within a distance range set from an external electronic device. Also, when it is sensed that position information of the mobile terminal is not within the specific place, the controller may change the representative card information to previously stored card information.

The controller (180 of FIG. 1A) activates the second wireless communication module and when it is sensed that a different mobile terminal in which a specific application is executed approaches an external electronic device installed in the specific place by a set distance simultaneously, the controller may perform payment on a payment amount with the external electronic device or may perform payment on a partial amount with the different mobile terminal. Here, the external electronic device installed in the specific place may have the second wireless communication module and perform payment with at least one mobile terminal through the second wireless communication module. In detail, when the different mobile terminal approaches the external electronic device by a set distance and performs payment on a payment amount with the external electronic device, the controller may perform payment on an amount obtained by dividing a total amount of the payment amount by a total number of mobile terminals and payment may be performed on the amount in each of the mobile terminals. When the terminal has approached the external electronic device within the set distance but does not directly perform payment on the payment amount with the external electronic device, the controller may perform payment to provide an amount obtained by dividing the total amount of the payment amount by the number of the entire mobile terminals to the different mobile terminal which has directly performed the payment. That is, when a plurality of mobile terminals approach the external electronic device within a distance range in which they are able to perform payment with the external electronic device, one of the plurality of mobile terminals may perform payment with the external electronic device and the other mobile terminals may perform payment by providing a partial amount to the mobile terminal which has performed the payment.

Figure 26:
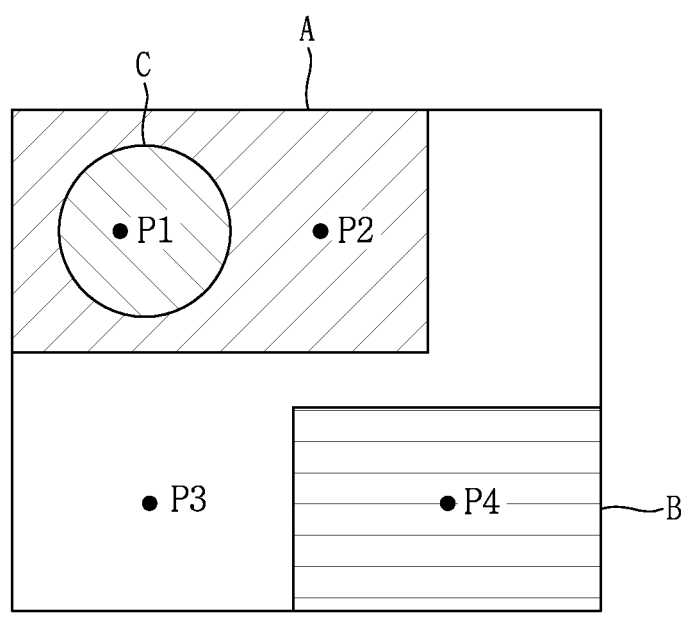

FIG. 26 is a view illustrating whether a mobile terminal related to the present disclosure enters a specific place.

Referring to FIG. 26, an external wireless sensor may determine whether BLE communication is possible within a specific place range and whether the mobile terminal enters the specific place by periodically broadcasting control signal.

For example, the first wireless sensor may determine whether BLE communication is able to be performed within a range of a region A and whether the mobile terminal enters the region A by periodically broadcasting a control signal.

Similarly, the second wireless sensor may determine whether BLE communication is able to be performed within a range of a region B and whether the mobile terminal enters the region B by periodically broadcasting a control signal. The first wireless sensor or the second wireless sensor may transmit identification information (A or B) of the specific place, position information (a latitude, a longitude, and indoor positioning coordinates of the shaded area), a wireless communication module that may be used in the specific place, an external electronic device, and the like, to the mobile terminal. Thus, when the terminal enters the region A or the region B, the controller may determine that the terminal enters the specific place.

Meanwhile, the controller may determine a region C within a set radius with respect to the external electronic device installed within the region A related to the first wireless sensor, as a specific place.

When the mobile terminal is positioned at the point P3, the mobile terminal may not be able to receive a control signal from the first wireless sensor and the second wireless sensor. However, when the mobile terminal P1 moves to the point P1, it may be able to receive a control signal from the first wireless sensor. In this case, the controller may receive information related to the region A from the first wireless sensor and recognize that the terminal has entered the region A. As mentioned above, the controller may determine a region (region A or region B) in which a signal from an external wireless sensor reaches, as a specific place, or may determine a predetermined region (region C) within the region in which a signal from the external wireless sensor reaches, as a specific place.

FIGS. 27 to 31 are views illustrating information related to a specific place and an embodiment of executing a specific application when a mobile terminal related to the present disclosure enters the specific place.

Figure 27:
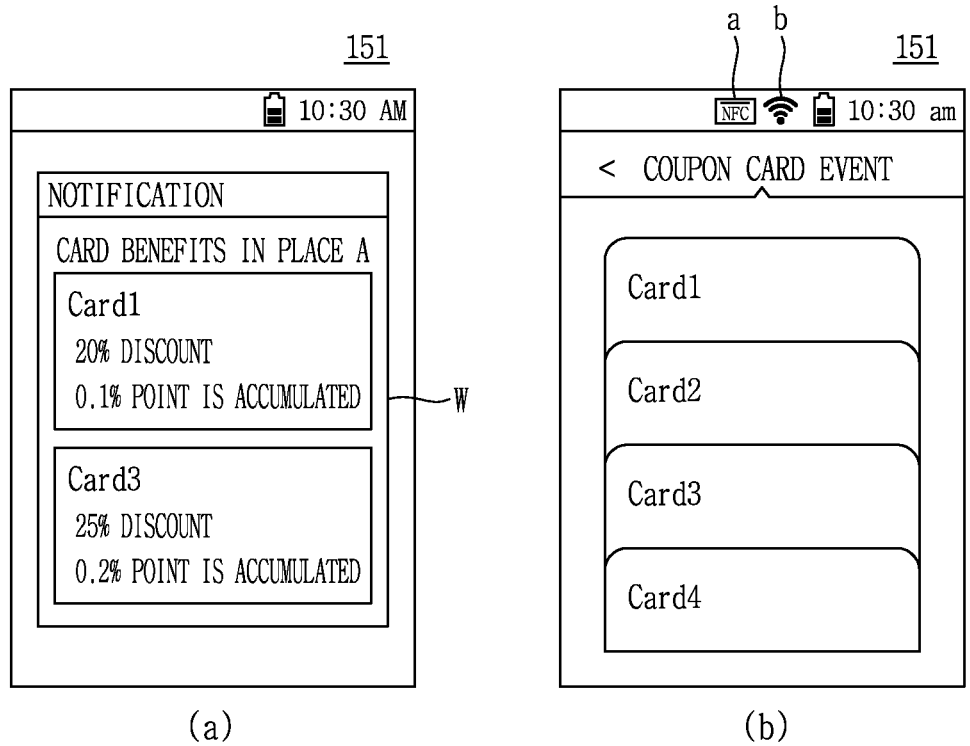

Referring to FIG. 27, the controller (180 of FIG. 1A) may sense that the terminal enters a specific place through the first wireless communication module, and receive information related to the specific place.

The first wireless communication module is a communication module implementing BLE, and the controller may set the BLE to a constantly activated state upon user confirmation at the time of initial setting. Hereinafter, it is assumed that the BLE is set to be in a constantly activated state.

When the first wireless communication module receives a signal having a set sensitivity or stronger from an eternal wireless sensor, the controller may determine that the terminal has entered a specific place. The signal may be a signal periodically broadcast from the external wireless sensor.

When the mobile terminal enters the specific place, the controller may receive information related to the specific place from the external wireless sensor and display the received information on the display unit 151. Here, the information related to the specific place may include at least one of a wireless communication module that may be used in the specific place, location information of the specific place, an identification name corresponding to the specific place, and card benefit information, coupon information, and discount information provided in the specific place. In detail, when the terminal enters the place A, the controller may display information related to card benefits that may be used in the place A, as a notification window W ((a) of FIG. 27).

When the mobile terminal enters the specific place, the controller may activate the second wireless communication module, execute a specific application, and display an execution screen of the specific application on the display unit 151. The specific application, an application allowing payment to be performed through the second wireless communication module, may register at least one card information. The controller may display the at least one registered card information on the display unit. When the second wireless communication module is activated, the controller may display an indicator a in the status bar ((b) of FIG. 27).

Referring to FIG. 28, the controller (180 of FIG. 1) may register a representative card among a plurality of cards stored in the specific application, and store the same. In a case in which Card1 is registered as a representative card, the controller may display Default(Ia) indicating the representative card in a portion of an image representing Card1, as an indicator ((a) of FIG. 28).

When recommended card information, among information related to a specific place, is received, the controller may change the representative card in the specific place according to the recommended card information, and display contents indicating whether to change the representative card, in the notification window W ((b) of FIG. 28).

When an input agreeing with the change of the representative card is received, the controller may automatically change the representative card ((c) of FIG. 28). Also, when the terminal enters the specific place, the controller may omit the process of checking whether to change the representative card, and automatically change the representative card. Also, the controller may automatically change the representative card only when the specific place has been registered in the specific application, and in a different place, the controller may check whether to change the representative card, and change accordingly.

Referring to FIG. 29, the controller (180 of FIG. 1A) may change a representative card through a drag input applied to the indicator Ia indicating a representative card displayed on the execution screen of the specific application.

In detail, the controller may drag the indicator Ia displayed on Card1 to Card4 to change the representative card to Card4. Here, when the drag input is received, the controller may display a notification window W inquiring as to whether to change the representative card to Card4. When the representative card is changed, the controller may display the indicator Ia indicating the representative card in a partial region of the Card4 image.

Figure 30:
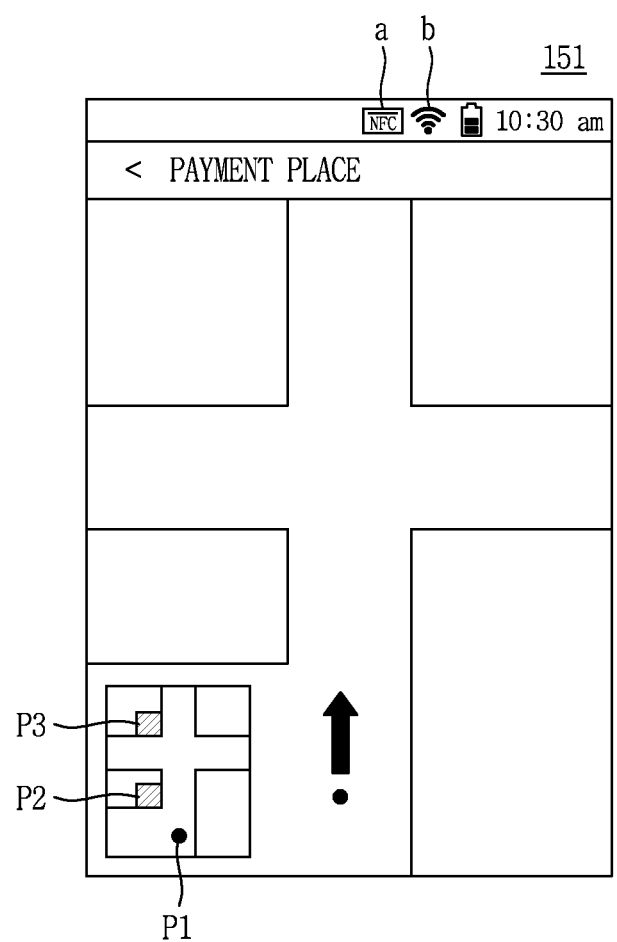

Referring to FIG. 30, the controller (180 of FIG. 1A) may display a map of a payment place and a route leading to the payment place on an execution screen of the specific application. In detail, the controller may display a map of the payment place as a mini-view in a partial region of the display unit, and display the route leading to the payment place in a region where the mini-view is not displayed.

Figure 31:
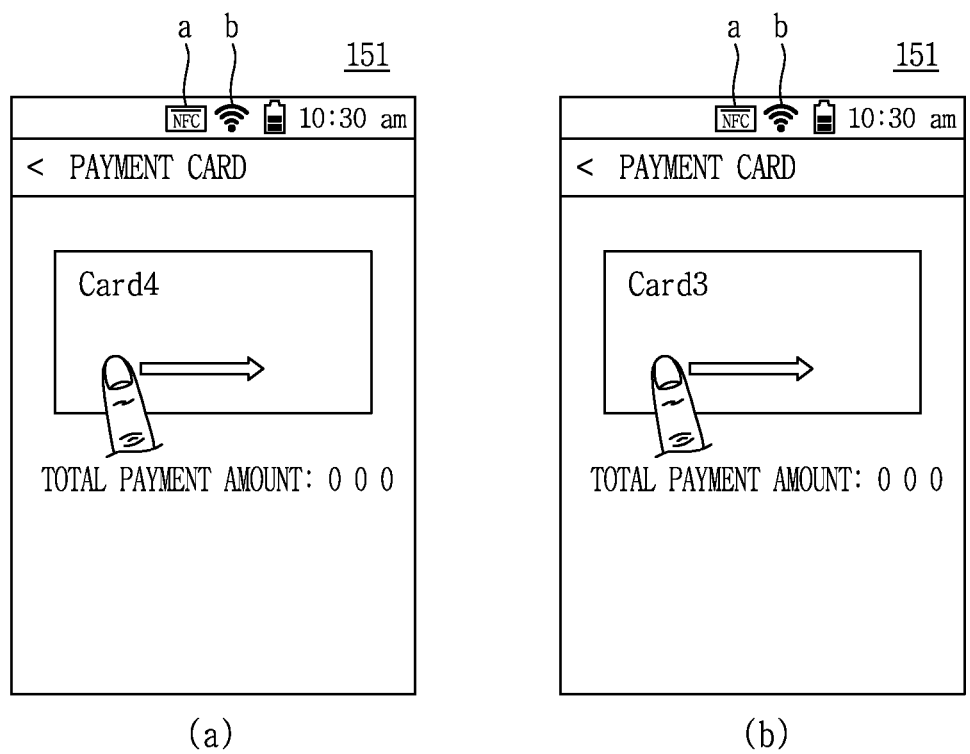

Referring to FIG. 31, the controller (180 of FIG. 1A) may display payment card information and a payment amount on the execution screen of the specific application. When the payment card is displayed as Card4, the controller may drag the region in which card information is displayed to change the payment card to another registered card (Card3).

Figure 32:
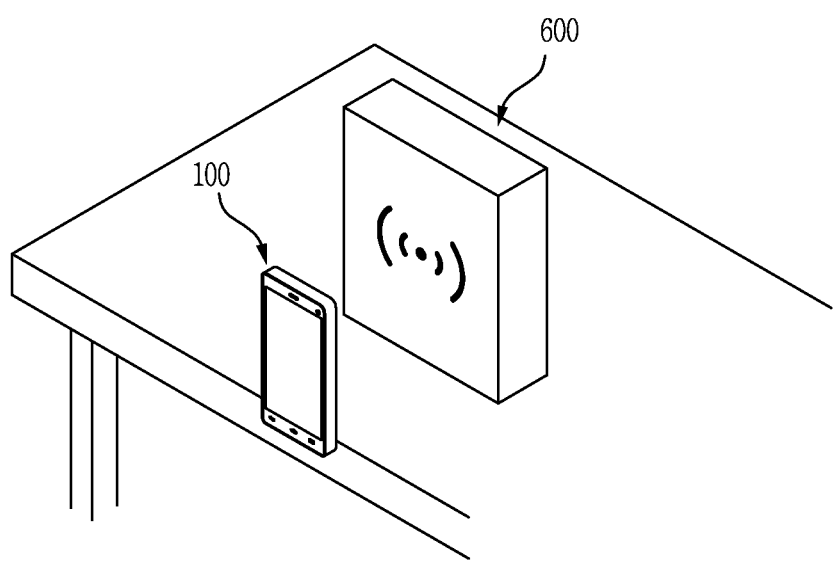
Figure 33:
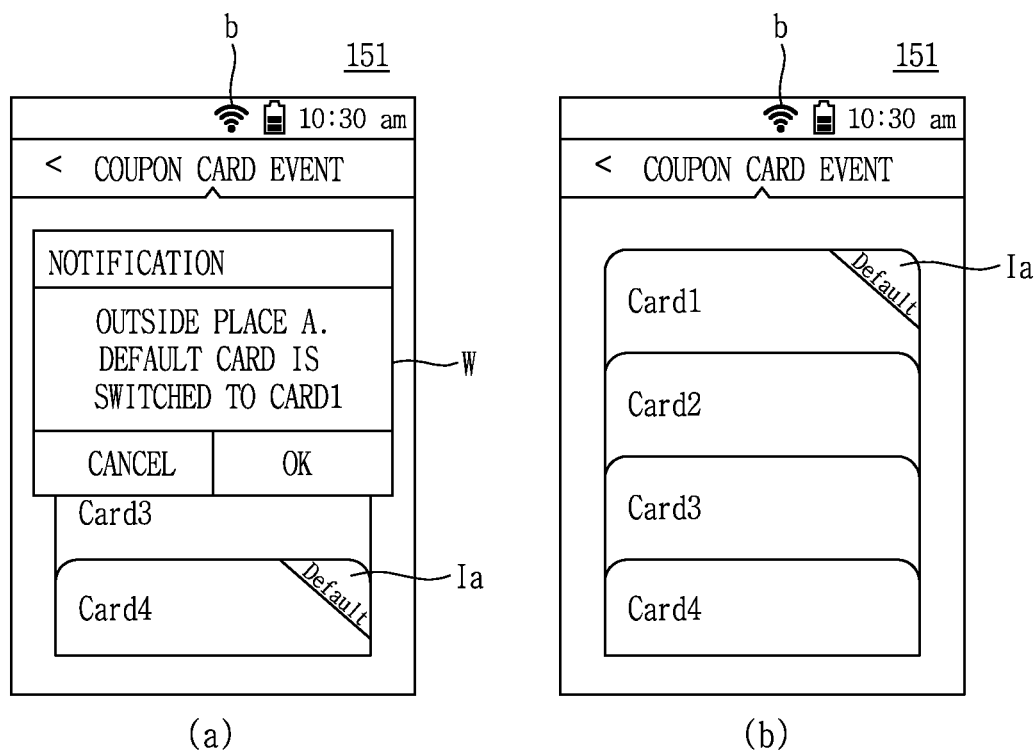
Figure 34:
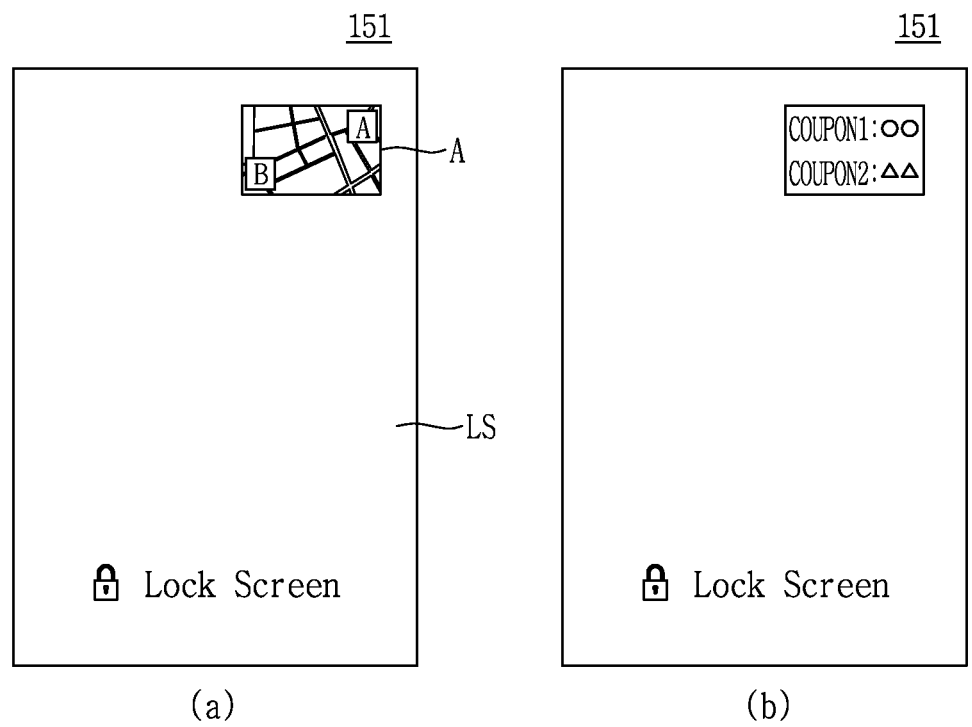

FIG. 32 is a view illustrating a method for performing payment in a mobile terminal related to the present disclosure, FIG. 33 is a view illustrating a control method when a mobile terminal related to the present disclosure is outside a specific place, and FIG. 34 is a view illustrating an embodiment of displaying an execution screen of a specific application on a lock screen of a mobile terminal related to the present disclosure.

Referring to FIG. 32, the controller (180 of FIG. 1A) may bring the mobile terminal 100 to within a distance range set with respect to an external electronic device 600 to perform payment. In detail, the controller may control the second wireless communication module of the mobile terminal 100 such that payment may be performed between the second wireless communication module (e.g., an NFC module) installed in the mobile terminal 100 and a second wireless communication module installed in the external electronic device 600.

Referring to FIG. 33, when position information of the mobile terminal moves out from the specific place, the controller (180 of FIG. 1A) may control the second wireless communication module to be automatically turned off.

When the second wireless communication module is deactivated, the controller may display corresponding information on the display unit. Also, when the mobile terminal is outside the specific area, the controller may return the changed representative card to the previous representative card.

In detail, when the mobile terminal moves out from the place A, the controller may display a notification indicating that the mobile terminal moves out from the place A and that a default card was changed to Card3, on the notification window W.

When the representative card is changed to a previous state before the mobile terminal entered the specific place, the controller may display a changed representative card Card1 using the indicator Ia.

Referring to FIG. 34, the controller (180 of FIG. 1A) may display partial contents of an execution screen of a specific application on a lock screen LS of the display unit 151.

In detail, the controller may display a map of a specific place including a position of an external electronic device performing payment in a partial region of the lock screen LS, as a mini-view A. Also, the controller may display coupon information included in the execution screen of the specific application in a partial region of the lock screen LS, as a mini-view A.

The controller may change contents displayed in the mini-view of the lock screen LS according to a distance to the external electronic device to perform payment, to display the changed contents. For example, when a distance to the external electronic device is longer than a first reference value, the controller may perform control to display a map. When the distance to the external electronic device is between the first reference value and a second reference value, the controller may perform control to display coupon information. When the distance to the external electronic device is closer than the second reference value, the controller may perform control to display a payment card or a payment amount.

Figure 35:
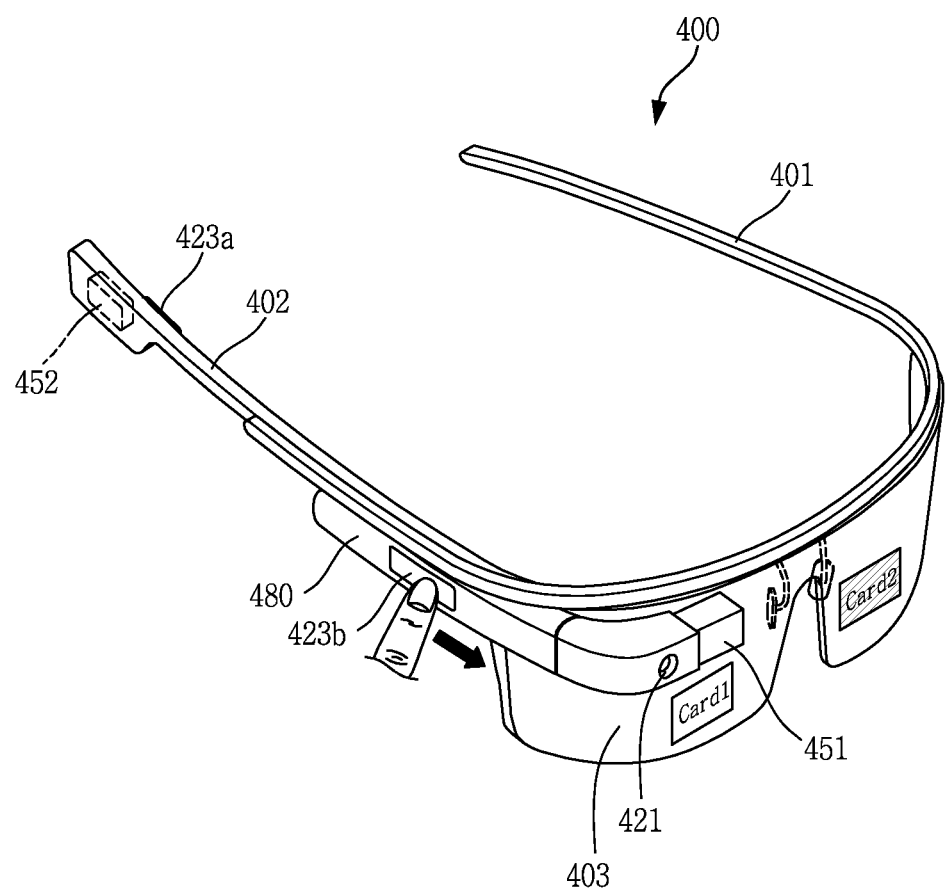

FIG. 35 is a view illustrating an embodiment of changing a representative card in a glass type mobile terminal related to the present disclosure.

Referring to FIG. 35, the controller (180 of FIG. 1A) may control a display unit 451 to display card information in at least one place of the user's left eye and right eye.

When a specific input is received through an input unit 423*b*, the controller may select a specific card Card2 and register it as a representative card. Also, when the glass type mobile terminal approaches an external electronic device by a set distance, the controller may perform payment using the representative card.

Figure 36:
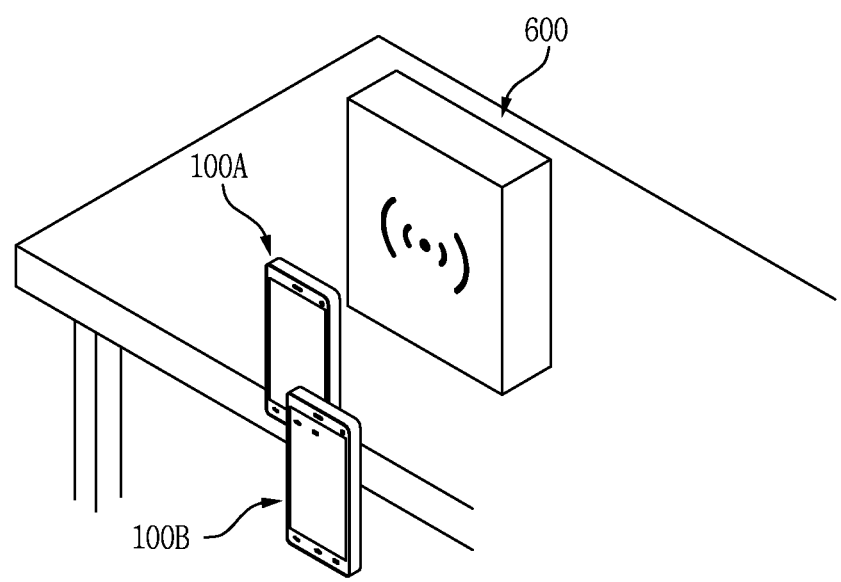

FIG. 36 is a view illustrating an embodiment in which a plurality of mobile terminals simultaneously perform payment according to the present disclosure.

Referring to FIG. 36, when the terminal together with another mobile terminal approach the external electronic device within a set range, the controller (180 of FIG. 1A) may perform payment on a payment amount together with the external electronic device, or may perform payment on a portion of the payment amount together with the other mobile terminal.

In detail, when a first mobile terminal 100A and a second mobile terminal 100B simultaneously enters an area within a distance set from the external electronic device 600, a controller of the first mobile terminal 100A may perform payment on a payment amount 10,000 Won together with the external electronic device 600. Also, the controller of the first mobile terminal 100A may perform payment together with a controller of the second mobile terminal 100B such that 5,000 Won corresponding to a half of the total payment 10,000 is paid by the second mobile terminal 100B. As a result, each of the first mobile terminal 100A and the second mobile terminal 100B may pay an amount of 5,000.

According to the present disclosure, whether the terminal enters a specific place is detected using the BLE, and when the terminal enters the specific place, the NFC module is automatically turned on to perform payment, and when the terminal moves out from the specific place, the NFC module is turned off, whereby payment may be easily guided to be performed, while battery consumption is minimized.

In addition, since a representative card to perform payment is automatically recommended according to information received using the BLE, the user may select an optimal payment card without having to individually check benefits related to a card.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A mobile terminal comprising:
a main body;
a communication unit performing wireless communication through a first wireless communication function and a second wireless communication function different to each other;
a display unit disposed in the main body and outputting an indicator indicating an activation state of at least one of the first and second wireless communication functions; and
a controller activating the second wireless communication function while the first wireless communication function is being activated on the basis of a specific place where the main body is positioned,
wherein when the second wireless communication function is activated, the controller executes a payment application using the second wireless communication function, controls the display unit to output a screen of the executed application, receives information related to the specific place through the first wireless communication function, and controls the display unit to output specific card information related to the specific place on the basis of the related information,
wherein in a case in which at least one external device capable of performing the second wireless communication function and the main body are positioned within a specific distance, the controller drives the payment application to pay a portion of a payment amount, and
wherein the controller performs a payment function of the payment application such that a portion of the payment amount is provided to one of the at least one external device through the second wireless communication function.

2. The mobile terminal of claim 1, wherein
the payment application is a payment application related to a card payment function using the second wireless communication function, and
the execution screen includes at least one card information.

3. The mobile terminal of claim 2, further comprising:
a memory storing a plurality of pieces of card information for performing a payment function of the payment application,
wherein the controller sets representative card information performing the payment function through at least one of the plurality of pieces of card information on the basis of information related to the specific place.

4. The mobile terminal of claim 3, wherein,
in a case in which initial representative card information corresponding to the payment application has been set, when information related to the specific place is received, the controller changes the initial representative card information on the basis of the information related to the specific place.

5. The mobile terminal of claim 3, wherein
when it is determined that the main body is not within the specific place on the basis of the first wireless communication function, the controller deactivates the second wireless communication function, and changes representative card information of the payment application to initial representative card information.

6. The mobile terminal of claim 5, wherein
in a case in which the payment application and information regarding the specific place are stored in the memory, the controller changes the initial representative card information to representative card information corresponding to information regarding the specific place.

7. The mobile terminal of claim 6, wherein
when information regarding a place other than the specific place stored together with the payment application is received, the controller controls the display unit to display a notification window for determining whether to change the initial representative card information.

8. The mobile terminal of claim 6, wherein
the card image is output as a notification window on the execution screen.

9. The mobile terminal of claim 2, wherein
card information related to the specific place is received through the first wireless communication function, and
the controller displays a card image corresponding to recommended card information related to the place on an execution screen.

10. The mobile terminal of claim 2, further comprising:
a memory storing a plurality of pieces of card information related to the payment application, wherein the controller selects one of the plurality of pieces of card information using information related to the place and displays an image of the selected card information on the execution screen.

11. The mobile terminal of claim 1, wherein the first and second wireless communication functions are formed as separate communication modules, and implemented as a single communication module including different physical layers respectively corresponding to the first and second wireless communication functions.

* * * * *